United States Patent
Kuo et al.

(10) Patent No.: US 11,783,612 B1
(45) Date of Patent: Oct. 10, 2023

(54) FALSE POSITIVE SUPPRESSION USING KEYPOINTS

(71) Applicant: Amazon Technologies, Inc., Seattle, WA (US)

(72) Inventors: Cheng-Hao Kuo, Kirkland, WA (US); Zhuo Deng, Bothell, WA (US); Che-Chun Su, Renton, WA (US); Yelin Kim, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 17/003,433

(22) Filed: Aug. 26, 2020

(51) Int. Cl.
*G06T 7/70* (2017.01)
*G06V 40/10* (2022.01)
*G06T 7/00* (2017.01)

(52) U.S. Cl.
CPC ............ *G06V 40/10* (2022.01); *G06T 7/0012* (2013.01); *G06T 7/70* (2017.01); *G06T 2207/20076* (2013.01); *G06T 2207/30196* (2013.01)

(58) Field of Classification Search
CPC ......... G06V 40/10; G06T 7/0012; G06T 7/70; G06T 2207/20076; G06T 2207/30196
See application file for complete search history.

(56) References Cited

U.S. PATENT DOCUMENTS

| | | | |
|---|---|---|---|
| 10,083,352 B1* | 9/2018 | Solh | G06V 40/10 |
| 2020/0074678 A1* | 3/2020 | Ning | G06T 7/75 |
| 2021/0042935 A1* | 2/2021 | Hiroi | G06T 7/246 |

* cited by examiner

*Primary Examiner* — John Villecco
*Assistant Examiner* — Han Hoang
(74) *Attorney, Agent, or Firm* — PIERCE ATWOOD LLP

(57) ABSTRACT

A system configured to reduce false positives when performing human presence detection is provided. In addition to calculating a Human Detection (HD) confidence score during human presence detection, the system may use human keypoint detection (HKD) techniques to calculate a true positive (TP) confidence score and detect false positives based on a combination of the two confidence scores. For example, the device system may generate keypoint data, which indicates a location and maximum confidence value for individual keypoints associated with a human body. The system may input the keypoint data to a model configured to generate the TP confidence score, such as a logistic regression model that is configured to receive numerical values as inputs (e.g., HD confidence score and 17 keypoint confidence values) and generate the TP confidence score. The system then detects false positives using the TP confidence score and may remove corresponding bounding boxes.

20 Claims, 14 Drawing Sheets

Cropped Image Data 340

Human Keypoint Detection (HKD) Model 420

Keypoint Heatmap Data 430

HKD Pipeline 400

FIG. 5B

| Keypoint Identifier 522 | Keypoint Confidence 524 | Keypoint Location 526 |
|---|---|---|
| Eye (R) | $c_1$ | $(x_1, y_1)$ |
| Eye (L) | $c_2$ | $(x_2, y_2)$ |
| Ear (R) | $c_3$ | $(x_3, y_3)$ |
| Ear (L) | $c_4$ | $(x_4, y_4)$ |
| Mouth | $c_5$ | $(x_5, y_5)$ |
| Shoulder (R) | $c_6$ | $(x_6, y_6)$ |
| Shoulder (L) | $c_7$ | $(x_7, y_7)$ |
| Elbow (R) | $c_8$ | $(x_8, y_8)$ |
| Elbow (L) | $c_9$ | $(x_9, y_9)$ |
| Wrist (R) | $c_{10}$ | $(x_{10}, y_{10})$ |
| Wrist (L) | $c_{11}$ | $(x_{11}, y_{11})$ |
| Hip (R) | $c_{12}$ | $(x_{12}, y_{12})$ |
| Hip (L) | $c_{13}$ | $(x_{13}, y_{13})$ |
| Knee (R) | $c_{14}$ | $(x_{14}, y_{14})$ |
| Knee (L) | $c_{15}$ | $(x_{15}, y_{15})$ |
| Ankle (R) | $c_{16}$ | $(x_{16}, y_{16})$ |
| Ankle (L) | $c_{17}$ | $(x_{17}, y_{17})$ |

Keypoint Data 520

Keypoint Visualization 510

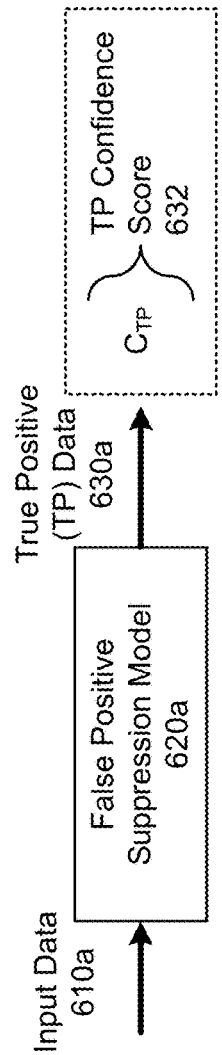

FIG. 7
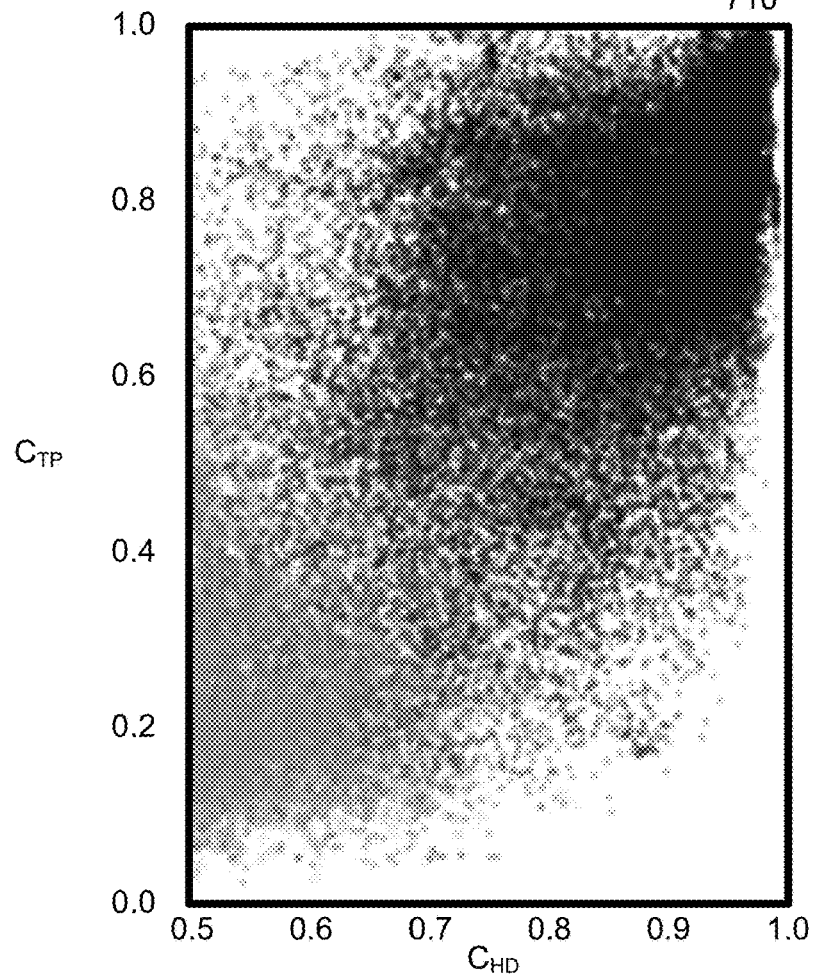
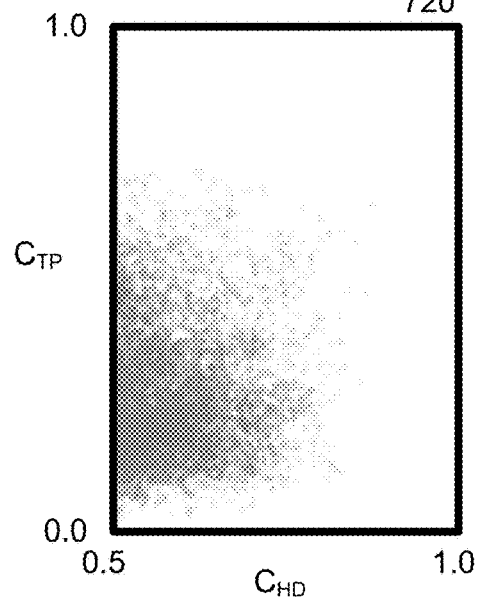
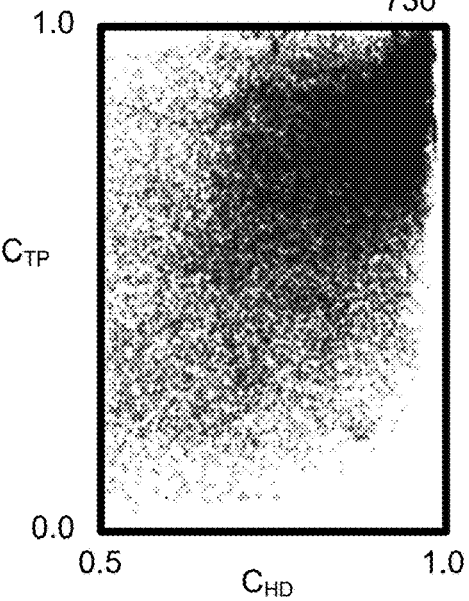

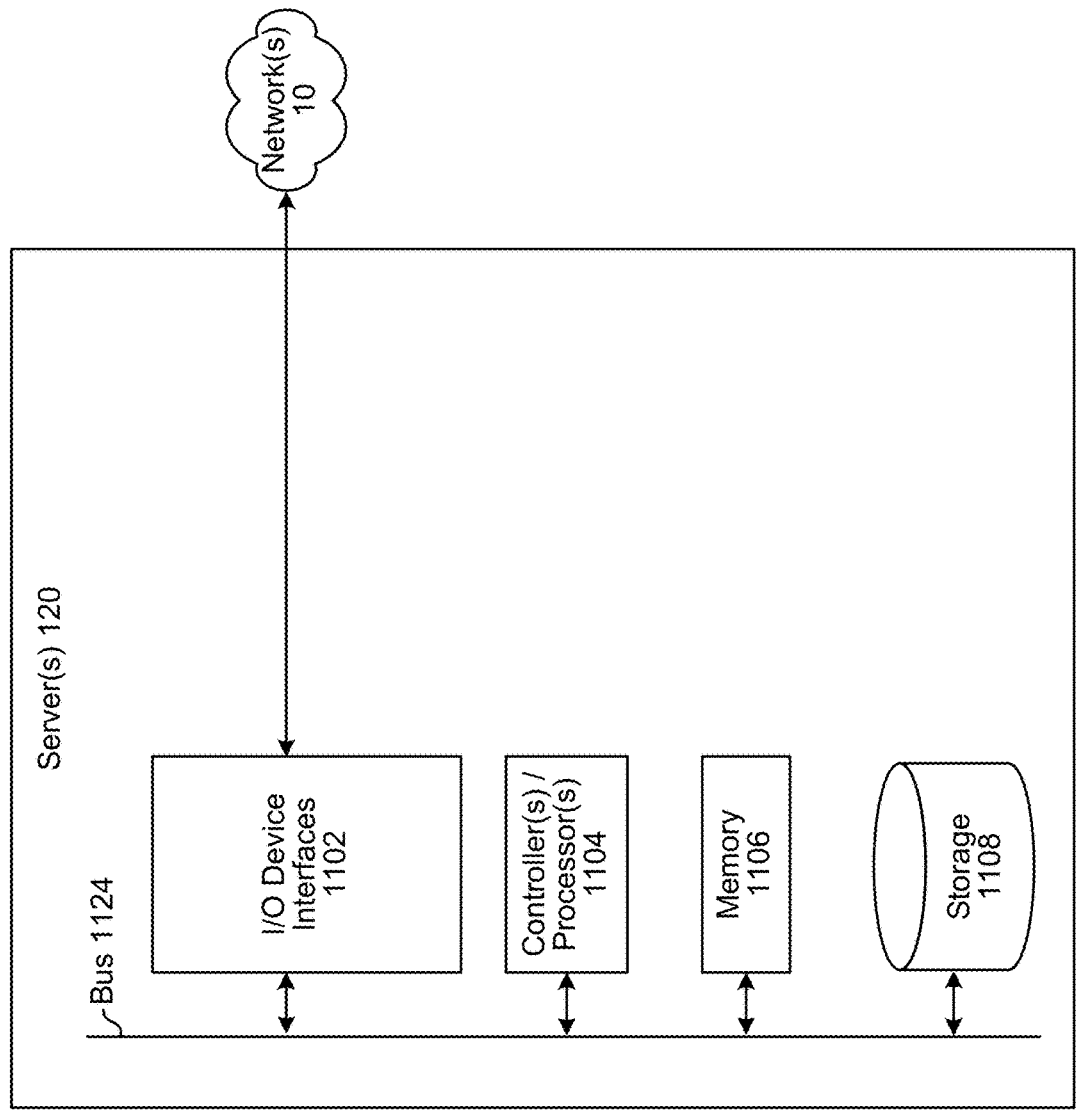

FALSE POSITIVE SUPPRESSION USING KEYPOINTS

BACKGROUND

With the advancement of technology, the use and popularity of electronic devices has increased considerably. Electronic devices are commonly used to capture and process image data.

BRIEF DESCRIPTION OF DRAWINGS

For a more complete understanding of the present disclosure, reference is now made to the following description taken in conjunction with the accompanying drawings.

FIGS. 5A-5B illustrate an example of converting keypoint heatmap data to keypoint data that includes keypoint confidence scores according to examples of the present disclosure.

FIGS. 6A-6C illustrate examples of false positive suppression models according to examples of the present disclosure.

FIG. 7 illustrates examples of distinguishing between false positives and true positives based on HD confidence values and TP confidence values according to examples of the present disclosure.

FIG. 11 is a block diagram conceptually illustrating example components of a remote system according to embodiments of the present disclosure.

DETAILED DESCRIPTION

Electronic devices may be used to capture and process image data. An electronic device may perform object detection (e.g., object detection, full face detection, half face detection, head and shoulders detection, etc.) and/or localization on the image data by generating one or more regions of interest. A region of interest may be associated with a confidence value indicating a likelihood that the object is represented in the region of interest. To perform human presence detection, a device may perform object detection using human/face detectors and remove regions of interest associated with confidence values below a threshold value. However, this can result in a number of false positives that are above the threshold value despite the region of interest not representing a human.

To improve human presence detection by reducing false positives, devices, systems and methods are disclosed that calculate a secondary confidence score (e.g., true positive (TP) confidence score) using human keypoint detection (HKD) techniques and detect human presence based on a combination of the two confidence scores. For example, the system may use a HKD model to generate keypoint data, which indicates a location and maximum confidence value for individual keypoints associated with a human body (e.g., joints). In some examples, the system calculates the TP confidence score directly from the keypoint data (e.g., by taking an average of the N highest confidence values) and determines whether human presence is detected using the HD confidence score and the TP confidence score (e.g., human presence is detected when both confidence scores are above a threshold). To further reduce false positives, the device may input the HD confidence score and the keypoint data into a machine learning model that is trained to calculate the TP confidence score and/or determine whether human presence is detected. For example, the device may train a logistic regression model that is configured to receive numerical values as inputs (e.g., 18 numerical values, such as the HD confidence score and 17 keypoint confidence values) and generate the TP confidence score.

Figure 1:
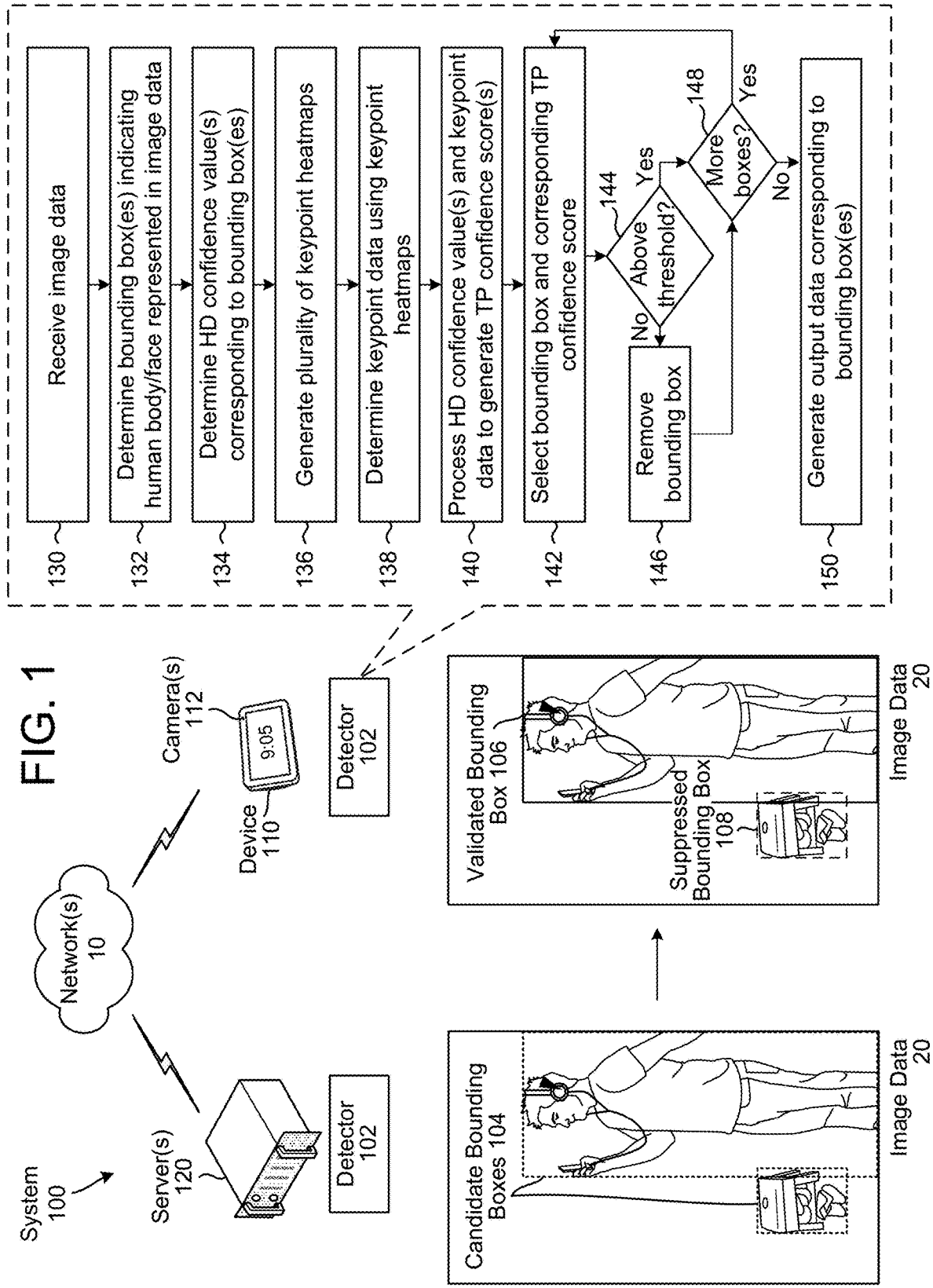
FIG. 1 illustrates a system according to embodiments of the present disclosure.

FIG. 1 illustrates a high-level conceptual block diagram of a system 100 configured to perform human presence detection and/or localization using a human keypoint detection (HKD) model and a false positive suppression model. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 and server(s) 120 that may be communicatively coupled to network(s) 10.

The device 110 may be an electronic device configured to capture and/or receive image data. In some examples, the device 110 may include camera(s) 112, although the disclosure is not limited thereto and the device 110 may receive the image data from a remote device 110 and/or an image capture device 114 without departing from the disclosure.

A detector 102 may be configured to perform human presence detection and/or localization on image data. In some examples, the device 110 may include the detector 102 and may process image data using the detector 102 to perform presence detection and/or detection localization. For example, the device 110 may include camera(s) 112 and may generate image data using the camera(s) 112. Additionally or alternatively, the image capture device 114 or the remote device 110 may include camera(s) 112 and may generate image data using the camera(s) 112. Therefore, the device 110 may receive the image data from the remote device 110/image capture device 114 via the network(s) 10 without departing from the disclosure.

The disclosure is not limited thereto, however, and in other examples the server(s) 120 may include the detector 102 and may process the image data using the detector 102 to perform presence detection and/or detection localization. For example, the device 110 and/or the image capture device 114 may generate the image data using the camera(s) 112 and the server(s) 120 may receive the image data from the device 110/image capture device 114 via the network(s) 10 without departing from the disclosure. For ease of illustration, FIG. 1 illustrates the detector 102 being included in both the device 110 and the server(s) 120, although the disclosure is not limited thereto and the detector 102 may be included in only one of the device 110 or the server(s) 120 without departing from the disclosure.

In some examples, the detector 102 may perform human presence detection to determine if human presence is detected in image data 20. Additionally or alternatively, the detector 102 may perform detection localization on the image data 20 to generate a region of interest corresponding to the human presence detected in the image data 20. As used herein, the region of interest may be referred to as a bounding box.

Using computer vision, an object detector may perform object detection on image data to identify one or more regions of interest associated with an object. The object detector may be trained to detect specific items, such as objects and/or humans (e.g., head and shoulder, half body, half face, full face, quarter face, etc.), and may analyze the image data and generate one or more regions of interest indicating an area of the image data corresponding to the specific item on which the object detector is trained. For example, a first object detector trained to detect a full face (e.g., face detector) may generate a first region of interest having a bounding box (e.g., minimum bounding box) surrounding a full face represented in the image data, whereas a second object detector trained to detect head and shoulders (e.g., head detector) may generate a second region of interest having a bounding box surrounding an upper portion of a torso (e.g., entire head and shoulders) that is represented in the image data. In addition to generating the first region of interest, the first object detector may generate a first confidence value indicating a level of confidence (e.g., likelihood) that a full face is represented in the first region of interest. Similarly, the second object detector may generate a second confidence value indicating a level of confidence that head and shoulders are represented in the second region of interest.

The region of interest may be associated with the selected item on which the object detector is trained (e.g., head and shoulders, full face, etc.), a candidate area of the image data (e.g., a plurality of pixels associated with the region of interest), which may be represented as a bounding box (e.g., minimum bounding box) indicating a perimeter of the candidate area, and/or a confidence value (e.g., confidence score) indicating a level of confidence (e.g., likelihood) that the specific item is represented in the candidate area. For example, the first region of interest may be associated with a small number of pixels (e.g., candidate area corresponding to a small rectangle surrounding a face in the image data) and a high confidence value (e.g., high likelihood that a full face is represented in the first region of interest). In contrast, the second region of interest may be associated with a large number of pixels (e.g., candidate area corresponding to a large rectangle in the image data) and a low confidence value (e.g., small likelihood that head and shoulders are represented in the second region of interest).

A single object detector may be trained to detect a single item and/or multiple items without departing from the disclosure. Additionally or alternatively, a single object detector may generate a single region of interest and/or multiple regions of interest without departing from the disclosure. In some examples, the system 100 may generate multiple regions of interest using a single object detector. Additionally or alternatively, the system 100 may use multiple detectors to generate one or more regions of interest without departing from the disclosure.

In the example illustrated in FIG. 1, the detector 102 may include one or more object detectors trained to detect a human. As used herein, these object detectors may be referred to as a Human Detector (HD)/Face Detector (FD) component (e.g., HD/FD component), or simply a Human Detector (HD) component. Using the HD component, the detector 102 may combine multiple regions of interest and/or bounding boxes associated with an individual human into a single bounding box. For example, the detector 102 may generate one bounding box if the HD component determines that a single human is represented in the image data 20, may generate two bounding boxes if the HD component determines that two humans are represented in the image data 20, and so on.

After generating a bounding box, the detector 102 may generate an HD confidence score corresponding to the bounding box that indicates a probability that a human is represented in the image data 20 within the bounding box. The detector 102 may compare the HD confidence score to a first presence detection threshold and may discard the bounding box if the HD confidence score is below the first presence detection threshold. However, in some examples the HD confidence score may exceed the first presence detection threshold despite the bounding box not including a representation of a human, which may be referred to as a false positive.

As illustrated in FIG. 1, the detector 102 may receive (130) image data, may determine (132) bounding box(es) indicating human body/face is represented in the image data, and determine (134) HD confidence value(s) corresponding to the bounding box(es). For example, the detector 102 may process the image data 20 and generate two bounding boxes and corresponding HD confidence values. As used herein, a bounding box generated by the HD component may be referred to as a candidate bounding box 104. For example, FIG. 1 illustrates that the detector 102 may generate two candidate bounding boxes 104 in the image data 20; a first candidate bounding box 104a corresponding to a human (e.g., true positive) and a second candidate bounding box 104b that does not correspond to a human (e.g., false positive).

Human Orientation Estimation (HOE), also known as pose estimation (e.g., skeleton estimation), refers to the localization and identification of human joints, which are also known as keypoints (e.g., elbows, wrists, etc.), represented in image data. In some examples, the detector 102 may perform HOE processing using human keypoint detection (HKD), although the disclosure is not limited thereto. For example, the detector 102 may include a HKD model configured to generate HKD data.

To reduce a number of false positives and improve human detection, the detector 102 may use the HKD data to generate a true positive (TP) confidence score. For example, if the HKD data indicates a high likelihood that multiple keypoints are represented in the image data 20, there is a high probability that a human is represented in the image data 20 as well. Thus, the detector 102 may use a combination of the HD confidence score and/or the TP confidence score to detect false positives and remove bounding boxes corresponding to the false positives.

Figure 4:
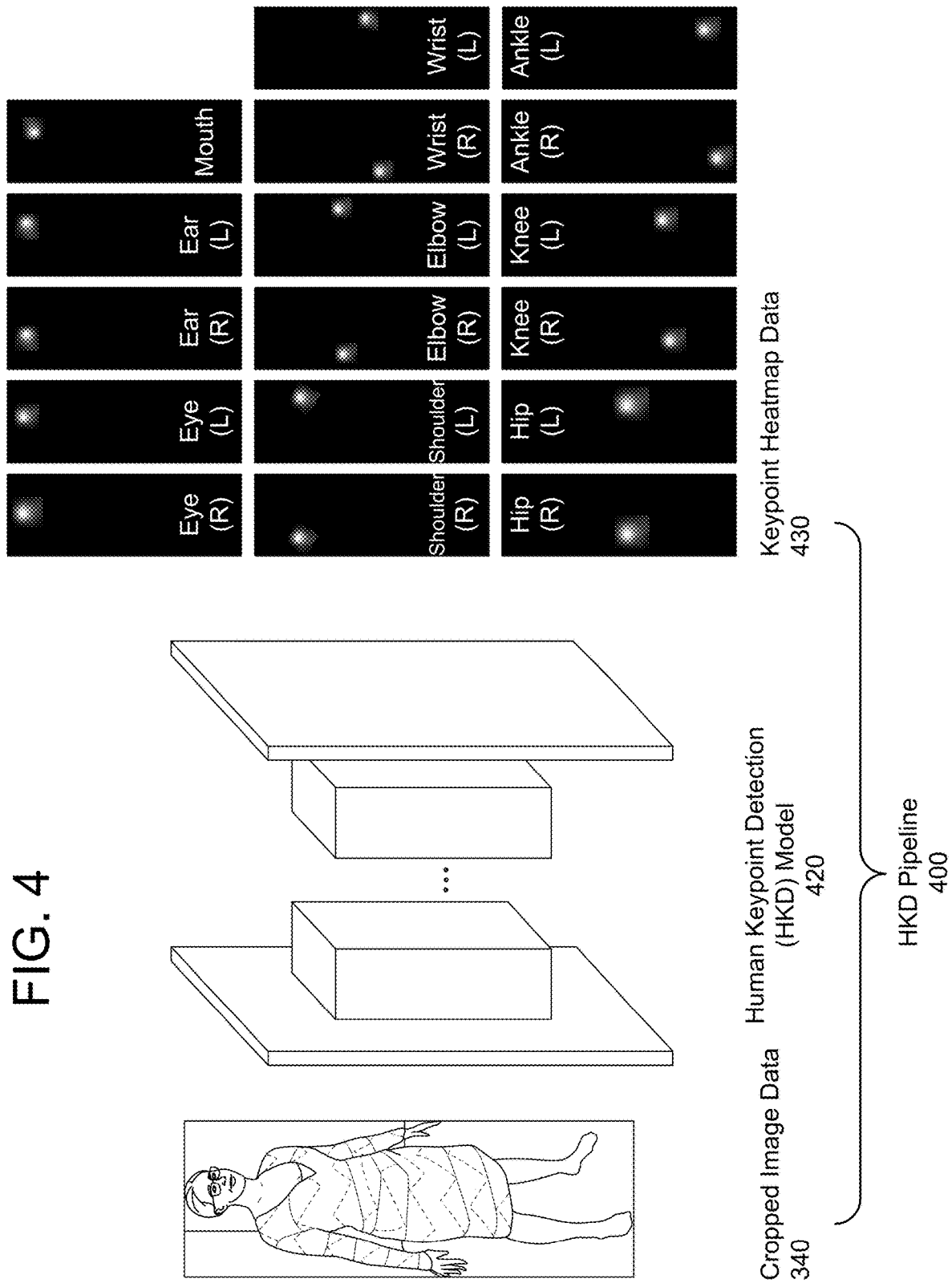
FIG. 4 illustrates an example of a human keypoint detection (HKD) model according to examples of the present disclosure.

As described in greater detail below with regard to FIGS. 4-5B, the detector 102 may generate (136) a plurality of keypoint heatmaps and determine (138) keypoint data using the keypoint heatmaps. For example, the detector 102 may determine keypoint data including two dimensional coordinates for a series of points along the body, which are referred to as keypoints. In some examples, the detector 102 may determine keypoint data corresponding to 17 different keypoints, as illustrated in FIG. 4, although the disclosure is not limited thereto.

The keypoint data indicates a maximum confidence value for each keypoint, along with the two dimensional coordinates corresponding to the maximum confidence value. For example, for a first keypoint, the keypoint data may include a first confidence value indicating a highest confidence value represented in the keypoint heatmap for the first keypoint, along with first coordinates associated with the first confidence value. Thus, the first confidence value indicates a likelihood that the first keypoint is represented in the image data 20 at the first coordinates.

Using the keypoint data, the detector 102 may process (140) the HD confidence value(s) and the keypoint data to generate one or more TP confidence score(s). By determining the TP confidence scores, the detector 102 may determine that the first candidate bounding box 104a corresponds to a validated bounding box 106 (e.g., human presence is detected), whereas the second candidate bounding box 104b corresponds to a suppressed bounding box 108 (e.g., human presence is not detected).

As illustrated in FIG. 1, the detector 102 may select (142) a bounding box and corresponding TP confidence score and determine (144) whether the TP confidence score is above a second presence detection threshold. If the TP confidence score is not above the second presence detection threshold, the detector 102 may remove (146) the bounding box in order to suppress a false positive.

After removing the bounding box, or if the TP confidence score is above the second presence detection threshold, the detector 102 may determine (148) whether there are additional bounding boxes and, if so, may loop to step 142 and repeat steps 142-148 for another bounding box. Thus, the detector 102 iteratively validates or suppresses each of the individual candidate bounding boxes.

To illustrate an example, the detector 102 may select the first candidate bounding box 104a and a first TP confidence score corresponding to the first candidate bounding box 104a and may determine whether the first TP confidence score is above the second presence detection threshold. In the example illustrated in FIG. 1, the first TP confidence score is above the second presence detection threshold, so the detector 102 may validate the first bounding box and determine whether there are additional bounding boxes. For example, the detector 102 may select the second candidate bounding box 104b and a second TP confidence score corresponding to the second candidate bounding box 104b and may determine whether the second TP confidence score is above the second presence detection threshold. In the example illustrated in FIG. 1, the second TP confidence score is below the second presence detection threshold, so the detector 102 may suppress (e.g., discard) the second bounding box.

If the detector 102 determines that there are no additional bounding boxes in step 148, the detector 102 may generate (150) output data corresponding to the bounding box(es). For example, the detector 102 may generate output data that only corresponds to the validated bounding box 106. However, the disclosure is not limited thereto, and in some examples the output data may correspond to both the validated bounding box 106 and the suppressed bounding box 108 without departing from the disclosure. For example, the output data may optionally indicate candidate bounding boxes that were suppressed, although the disclosure is not limited thereto.

Figure 2:
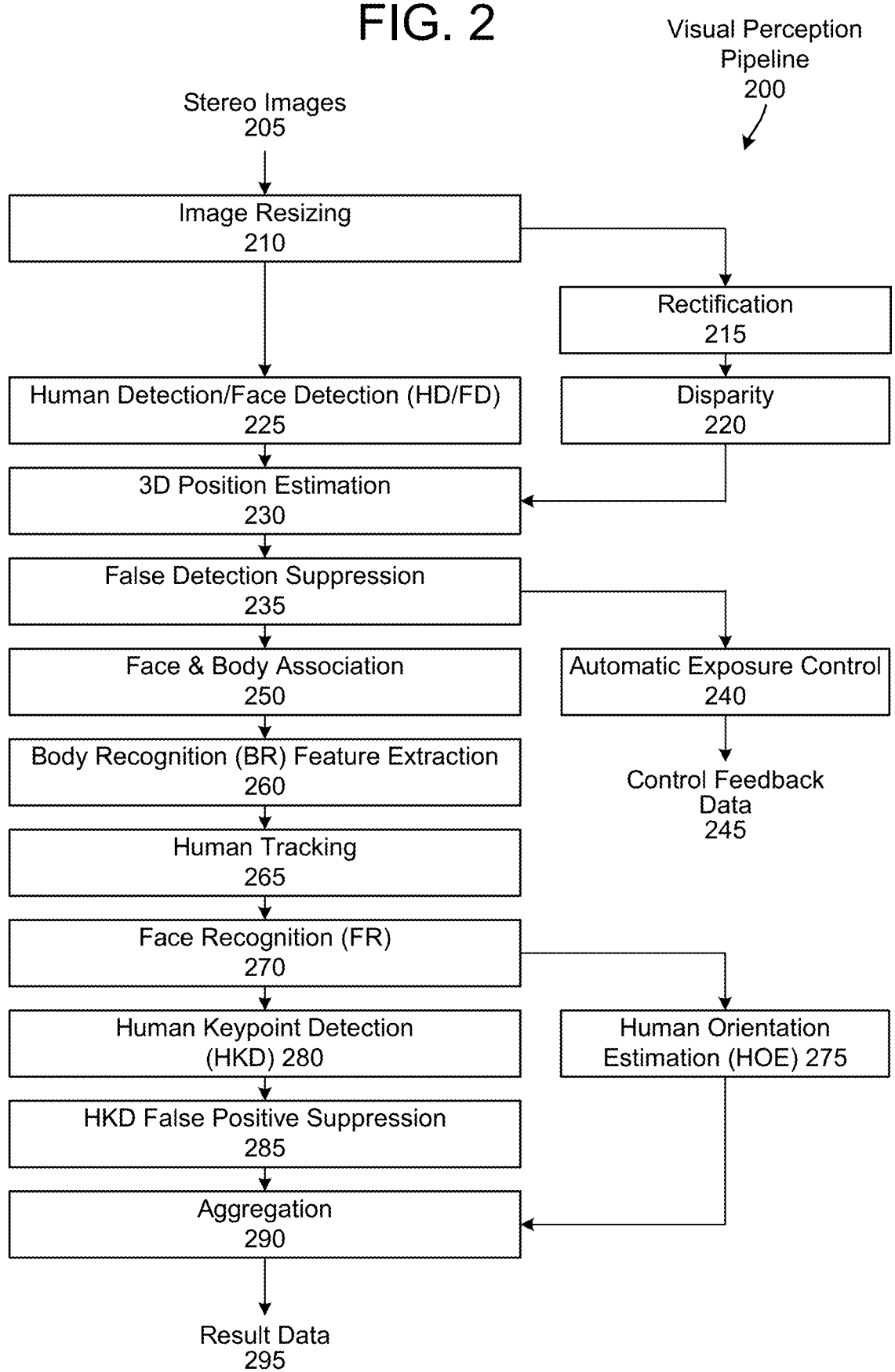
FIG. 2 illustrates an example of a visual perception pipeline according to examples of the present disclosure.

FIG. 2 illustrates an example of a visual perception pipeline according to examples of the present disclosure. As illustrated in FIG. 2, a visual perception pipeline 200 may receive stereo images 205, such as a first image generated by a first image sensor and a second image generated by a second image sensor. Using the stereo images 205, the detector 102 may perform image resizing 210 to generate input image data having a desired resolution. For example, the detector 102 may perform downsampling or other processing to decrease a resolution of the input image data. However, the disclosure is not limited thereto, and the detector 102 may not perform image resizing without departing from the disclosure.

Using the input image data, the detector 102 may perform rectification 215 and disparity processing 220 to generate a disparity map. For example, the detector 102 may perform rectification to correct for image distortion or other defects associated with the image sensors, although the disclosure is not limited thereto. Using the corrected input image data, the disparity processing 220 may generate the disparity map to indicate a relative pixel difference or motion between the first image and the second image. For example, first pixels associated with objects in a foreground (e.g., close to the image sensors) may have a relatively large pixel difference between the first image and the second image, while second pixels associated with objects in a background (e.g., far from the image sensors) may have a relatively small pixel difference between the first image and the second image.

In parallel to performing the rectification 215 and disparity processing 220, the detector 102 may perform human detection/face detection (HD/FD) 225 using the input image data. For example, the detector 102 may include one or more object detectors trained to detect a human, such as a human detector (HD) and/or a face detector (FD). For ease of illustration, the following description may refer to the detector 102 including an HD component, although the disclosure is not limited thereto and the detector 102 may include a FD component, multiple HD components, and/or a combination thereof without departing from the disclosure. Using the HD component, the detector 102 may combine multiple regions of interest and/or bounding boxes associated with an individual human into a single bounding box. For example, the detector 102 may generate one bounding box if the HD component determines that a single human is represented in the input image data, may generate two bounding boxes if the HD component determines that two humans are represented in the input image data, and so on.

After generating a bounding box, the HD component may generate an HD confidence score corresponding to the bounding box that indicates a probability that a human is represented in the input image data within the bounding box. The HD confidence score may range from a minimum value (e.g., 0.0) to a maximum value (e.g., 1.0) based on the likelihood that a human is represented within the bounding box. The detector 102 may compare the HD confidence score to a first presence detection threshold (e.g., 0.5) and may discard the bounding box if the HD confidence score is below the first presence detection threshold. The HD/FD processing 225 may generate HD data, as described in greater detail below with regard to FIG. 3.

Using the HD data (e.g., bounding box(es) and/or HD confidence score(s)) and the disparity map, the detector 102 may perform 3D position estimation 230. For example, the detector 102 may determine three dimensional coordinates for each of the bounding boxes indicated by the HD data. As each bounding box corresponds to a human or a portion of a human, the detector 102 may generate 3D position data indicating 3D coordinates associated with the human(s) represented in the input image data.

The detector 102 may perform false detection suppression 235 to suppress bounding boxes that are not likely to represent a human. For example, the detector 102 may determine that 3D coordinate data associated with a bounding box corresponds to an image of a human instead of a three-dimensional human and may suppress the bounding box. However, the disclosure is not limited thereto and the detector 102 may perform false detection suppression 235 using other techniques without departing from the disclosure.

The detector 102 may perform automatic exposure control 240 to generate control feedback data 245. In some examples, the detector 102 may generate control feedback data 245 that includes exposure control feedback to improve the input image data. For example, the detector 102 may determine that an exposure level associated with a bounding box is too high (e.g., too bright or overexposed) and may generate control feedback data 245 instructing the image sensors to reduce an exposure level of subsequent image data. Alternatively, the detector 102 may determine that the exposure level associated with a bounding box is too low (e.g., too dark or underexposed) and may generate control feedback data 245 instructing the image sensors to increase an exposure level of subsequent image data.

The detector 102 may perform face and body association 250 and body recognition (BR) feature extraction 260. For example, the detector 102 may associate bounding boxes corresponding to a human face and/or parts of a human body, although the disclosure is not limited thereto. The detector 102 may perform BR feature extraction 260 to generate a feature vector including a plurality of data points (e.g., 2048 entries, although the disclosure is not limited thereto).

Using the disparity map generated by the disparity processing 220, the HD data generated by the HD/FD processing 225, the 3D position data generated by the 3D position estimation 230, and the feature vector generated by the BR feature extraction 260, the detector 102 may perform human tracking 265 to distinguish between different bounding boxes and track the bounding boxes over time. For example, the human tracking 265 may generate tracking identification data that includes a unique identification for each bounding box.

The detector 102 may perform face recognition (FR) 270, which may include face landmark detection, face embedding, and/or additional steps. For example, the detector 102 may process the input image data to generate cropped image data corresponding to bounding boxes generated by the face detector. Using the cropped image data, the detector 102 may perform face landmark detection to determine face landmark data. For example, the face landmark data may include two-dimensional positions of facial landmarks along with a confidence score indicating a likelihood that the 2D position corresponds to the facial landmark. In some examples, the face landmark detection may detect five facial landmarks, although the disclosure is not limited thereto. Using the cropped image data and the face landmark data, the detector 102 may perform face embedding to generate a face feature vector. For example, the detector 102 may perform face embedding to generate a feature vector including a plurality of data points (e.g., 512 entries, although the disclosure is not limited thereto).

As described above, Human Orientation Estimation (HOE), also known as pose estimation (e.g., skeleton estimation), refers to the localization and identification of human joints, which are also known as keypoints (e.g., elbows, wrists, etc.), represented in image data. As illustrated in FIG. 2, the detector 102 may perform HOE processing 275 and Human Keypoint Detection (HKD) 280 as two separate steps to generate orientation data and keypoint data. However, the disclosure is not limited thereto and the detector 102 may perform HOE processing as a single step to generate the orientation data and the keypoint data without departing from the disclosure.

As illustrated in FIG. 2, the detector 102 may perform HOE processing 275 to generate the orientation data, which may represent an orientation of a human using a plurality of data points (e.g., 72 entries), although the disclosure is not limited thereto. Separately, the detector 102 may perform HKD processing 280 to determine the keypoint data, which may represent a two-dimensional (2D) position for a plurality of keypoints (e.g., 17 separate keypoints). In some examples, the keypoint data may correspond to a plurality of keypoint heatmaps, with a first pixel in a first keypoint heatmap indicating a likelihood that a corresponding pixel in the input image data represents a first keypoint. However, the disclosure is not limited thereto, and the keypoint data may instead correspond to a plurality of keypoint confidence values (e.g., highest confidence value represented in an individual keypoint heatmap for each of the plurality of keypoints) and/or a plurality of keypoint locations (e.g., 2D position data for the plurality of keypoints) without departing from the disclosure.

As described above, the detector 102 may generate HD data representing bounding boxes having HD confidence scores that exceed the first presence detection threshold value. However, in some examples the HD confidence score may exceed the first presence detection threshold despite the bounding box not including a representation of a human, which may be referred to as a false positive. To reduce false positives, the detector 102 may perform HKD false positive suppression 285, as described in greater detail below, to generate a True Positive (TP) confidence score and suppress bounding boxes having a TP confidence score that is below a second presence detection threshold value, although the disclosure is not limited thereto. Thus, the HKD false positive suppression 285 generates TP output data that indicates whether an individual bounding box is validated (e.g., true positive) or suppressed (e.g., false positive).

Using the TP output data and/or the orientation data generated during HOE processing 275, the detector 102 may perform aggregation 290 to generate result data 295. For example, the result data 295 may include at least a portion of the 3D position data generated by 3D position estimation 230, the unique bounding boxes generated by human tracking 265, the face feature vector generated by face recognition 270, the orientation data generated by HOE processing 275, and/or the TP output data generated by HKD false positive suppression 285.

Figure 3:
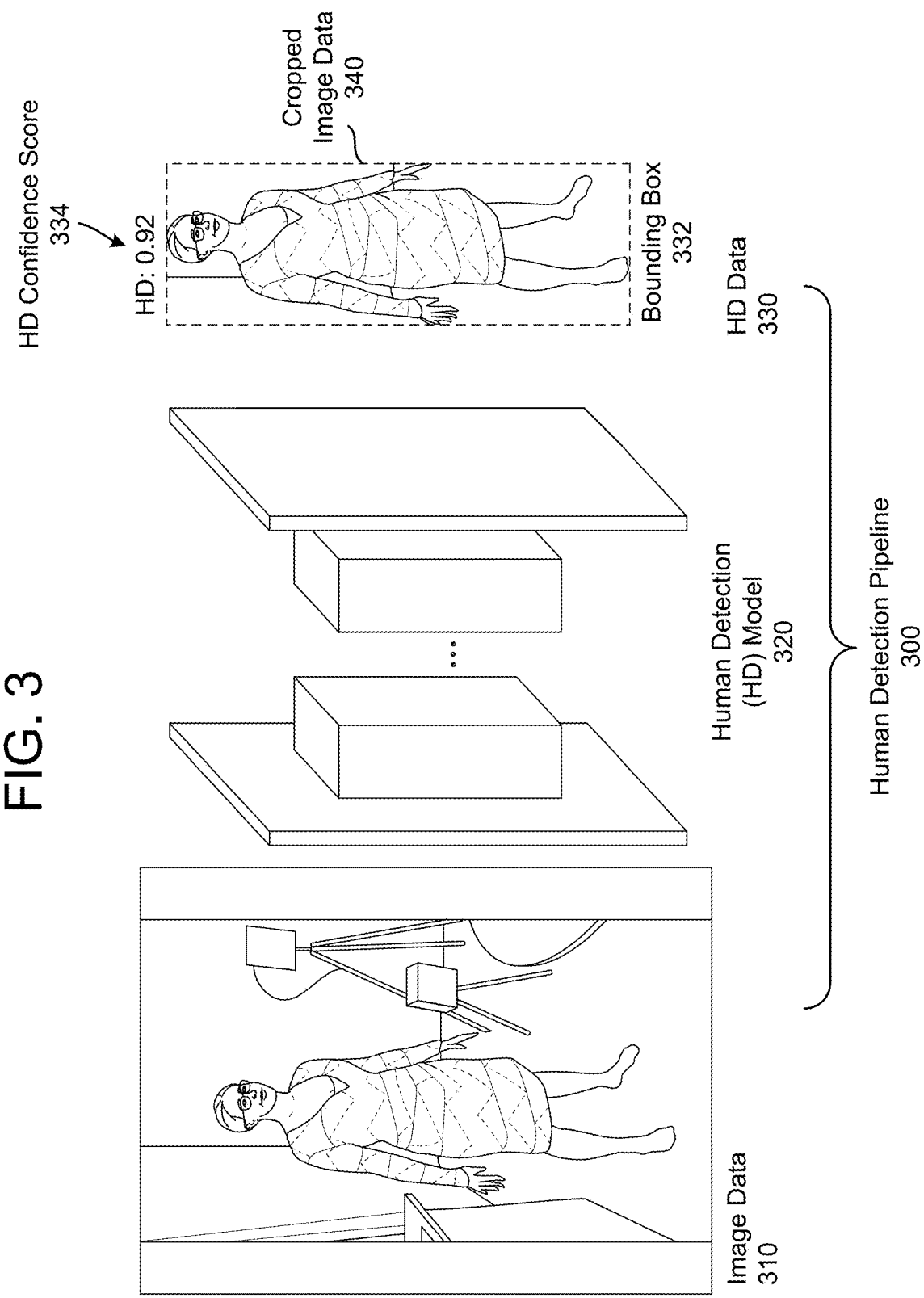
FIG. 3 illustrates an example of a human detection (HD) model according to examples of the present disclosure.

FIG. 3 illustrates an example of a human detection (HD) model according to examples of the present disclosure. As illustrated in FIG. 3, the human detection pipeline 300 includes an HD model 320 that is configured to receive image data 310 and to generate HD data 330. For example, the human detection pipeline 300 may input the image data 310 to the HD model 320 and the HD model 320 may perform human presence detection to generate one or more bounding boxes corresponding to human presence represented in the image data 310. In addition, the HD model 320 calculates an HD confidence score associated with each bounding box, the HD confidence score indicating a probability that at least a portion of a human is represented in the image data within the bounding box.

FIG. 3 illustrates an example of the HD data 430 including a bounding box 332 (e.g., output region of interest) and a corresponding HD confidence score 334 (e.g., HD: 0.92). For example, the HD confidence score 334 indicates that the HD model 320 estimates a 92% probability or likelihood that a human is represented within the bounding box 332.

While the HD data 330 may correspond to the bounding box 332 and the HD confidence score 334, the detector 102 may use the bounding box 332 and the image data 310 to generate cropped image data 340 corresponding to the bounding box 332. Thus, the bounding box 332 may correspond to coordinate data that indicates a portion of the image data 310 and the cropped image data 340 corresponds to the portion of the image data 310.

While the example illustrated in FIG. 3 illustrates the HD data 330 including a single bounding box 332, the disclosure is not limited thereto. In some examples, the HD data 330 may include multiple bounding boxes without departing from the disclosure. For example, the image data 310 may include a representation of multiple humans, and the HD data 330 may include an individual bounding box for each of the multiple humans. Additionally or alternatively, the HD model 320 may generate multiple bounding boxes corresponding to a single human without departing from the disclosure. For example, the HD model 320 may be configured to generate a separate bounding box for different parts of the human body without departing from the disclosure. Thus, the HD model 320 may generate a first bounding box corresponding to a representation of the entire body in the image data 310, a second bounding box corresponding to a representation of head and shoulders in the image data 310, a third bounding box corresponding to a representation of a face in the image data 310, and so on.

While FIG. 3 illustrates the human detection pipeline 300 as including the HD model 320, the disclosure is not limited thereto and the human detection pipeline 300 may include a Face Detection (FD) model instead of and/or in addition to the HD model 320 without departing from the disclosure. In some examples, the HD model 320 may be configured to perform human detection as well as face detection without departing from the disclosure. However, the disclosure is not limited thereto and in other examples, the human detection pipeline 300 may include the HD model 320 and/or the FD model without departing from the disclosure.

FIG. 4 illustrates an example of a human keypoint detection (HKD) model according to examples of the present disclosure. As described above, the HD model 320 is configured to detect human presence and determine whether a human is represented in the image data 310. If human presence is detected in the image data 310, the HD model 320 may generate a bounding box surrounding a representation of at least a portion of the human. However, the bounding box only indicates that a human is represented in a portion of the image data 310 and in some examples the bounding box may be associated with a label indicating a type of body part detected (e.g., face, head and shoulders, entire body, etc.). Thus, the output of the HD model 320 does not provide much information about what portion of the body is represented in the bounding box and/or an orientation of the human as represented in the image data 310.

Human Orientation Estimation (HOE), also known as pose estimation (e.g., skeleton estimation), refers to the localization and identification of human joints, which are also known as keypoints (e.g., elbows, wrists, etc.), represented in image data. The HKD model is an example of performing Human Orientation Estimation, although the disclosure is not limited thereto. Once the detector 102 determines that human presence is detected, the detector 102 may perform HKD processing to determine information about an orientation of the human body and/or locations of individual points along the body (e.g., joints, although the disclosure is not limited thereto). For example, the HKD processing may determine two dimensional coordinates for a series of points along the body, which are referred to as keypoints, along with orientation data indicating an orientation of the body. In some examples, the detector 102 may generate orientation data that includes 72 orientation bins, representing the human orientation (e.g., orientation of the human body) in terms of degrees. However, this is intended to conceptually illustrate a single example and the disclosure is not limited thereto.

In some examples, the detector 102 may calculate 17 different keypoints. For example, the HKD processing may determine five keypoints associated with a face, such as a first location corresponding to a left eye, a second location corresponding to a right eye, a third location corresponding to a left ear, a fourth location corresponding to a right ear, and a fifth location corresponding to a mouth. In addition, the HKD processing may determine an additional twelve keypoints associated with a body, such as a sixth location corresponding to a left shoulder, a seventh location corresponding to a right shoulder, an eighth location corresponding to a left elbow, a ninth location corresponding to a right elbow, a tenth location corresponding to a left wrist, an eleventh location corresponding to a right wrist, a twelfth location corresponding to a left hip, a thirteenth location corresponding to a right hip, a fourteenth location corresponding to a left knee, a fifteenth location corresponding to a right knee, a sixteenth location corresponding to a left ankle, and a seventeenth location corresponding to a right ankle. However, this is intended to conceptually illustrate a single example and the disclosure is not limited thereto.

As illustrated in FIG. 4, a human keypoint detection (HKD) pipeline 400 may include a HKD model 420 that is configured to receive the cropped image data 340 and to generate keypoint heatmap data 430. While FIG. 4 illustrates the HKD pipeline 400 inputting the cropped image data 340 to the HKD model 420, the disclosure is not limited thereto. In some examples, the HKD pipeline 400 may input the image data 310 and the bounding box 332 to the HKD model 420 and the HKD model 420 may generate the cropped image data 340 without departing from the disclosure.

Using the cropped image data 340, the HKD model 420 may generate the keypoint heatmap data 430. For example, the HKD model 420 may perform HKD processing on the cropped image data 340 to generate a plurality of keypoint heatmaps. In the example illustrated in FIG. 4, the HKD model 420 generates 17 individual keypoint heatmaps, as discussed above. For example, the HKD model 420 may generate a first keypoint heatmap for a first keypoint (e.g., right eye), a second keypoint heatmap for a second keypoint (e.g., left eye), a third keypoint heatmap for a third keypoint (e.g., right ear), a fourth keypoint heatmap for a fourth keypoint (e.g., left ear), and a fifth keypoint heatmap for a fifth keypoint (e.g., mouth). The HKD model 420 may also generate a sixth keypoint heatmap for a sixth keypoint (e.g., right shoulder), a seventh keypoint heatmap for a seventh keypoint (e.g., left shoulder), an eighth keypoint heatmap for an eighth keypoint (e.g., right elbow), a ninth keypoint heatmap for a ninth keypoint (e.g., left elbow), a tenth keypoint heatmap for a tenth keypoint (e.g., right wrist), an eleventh keypoint heatmap for an eleventh keypoint (e.g., left wrist), a twelfth keypoint heatmap for a twelfth keypoint (e.g., right hip), a thirteenth keypoint heatmap for a thirteenth keypoint (e.g., left hip), a fourteenth keypoint heatmap for a fourteenth keypoint (e.g., right knee), a fifteenth keypoint heatmap for a fifteenth keypoint (e.g., left knee), a sixteenth keypoint heatmap for a sixteenth keypoint (e.g., right ankle), and a seventeenth keypoint heatmap for a seventeenth keypoint (e.g., left ankle). While FIG. 4 illustrates an example using seventeen keypoints, this is intended to conceptually illustrate a single example and the disclosure is not limited thereto. Thus, the number of keypoints may vary without departing from the disclosure.

A heatmap is a representation of data, where the individual values (e.g., keypoint confidence values) are represented as colors. As used herein, a heatmap may be referred to as a graphical representation without departing from the disclosure, although the heatmap may correspond to the graphical representation itself (e.g., image) and/or heatmap data used to generate the graphical representation. For example, a pixel in the heatmap may have a pixel value (e.g., color value and/or intensity value), which is determined based on the keypoint confidence value associated with the pixel, and the heatmap data may indicate the pixel values for each pixel in the heatmap.

Figure 5A:
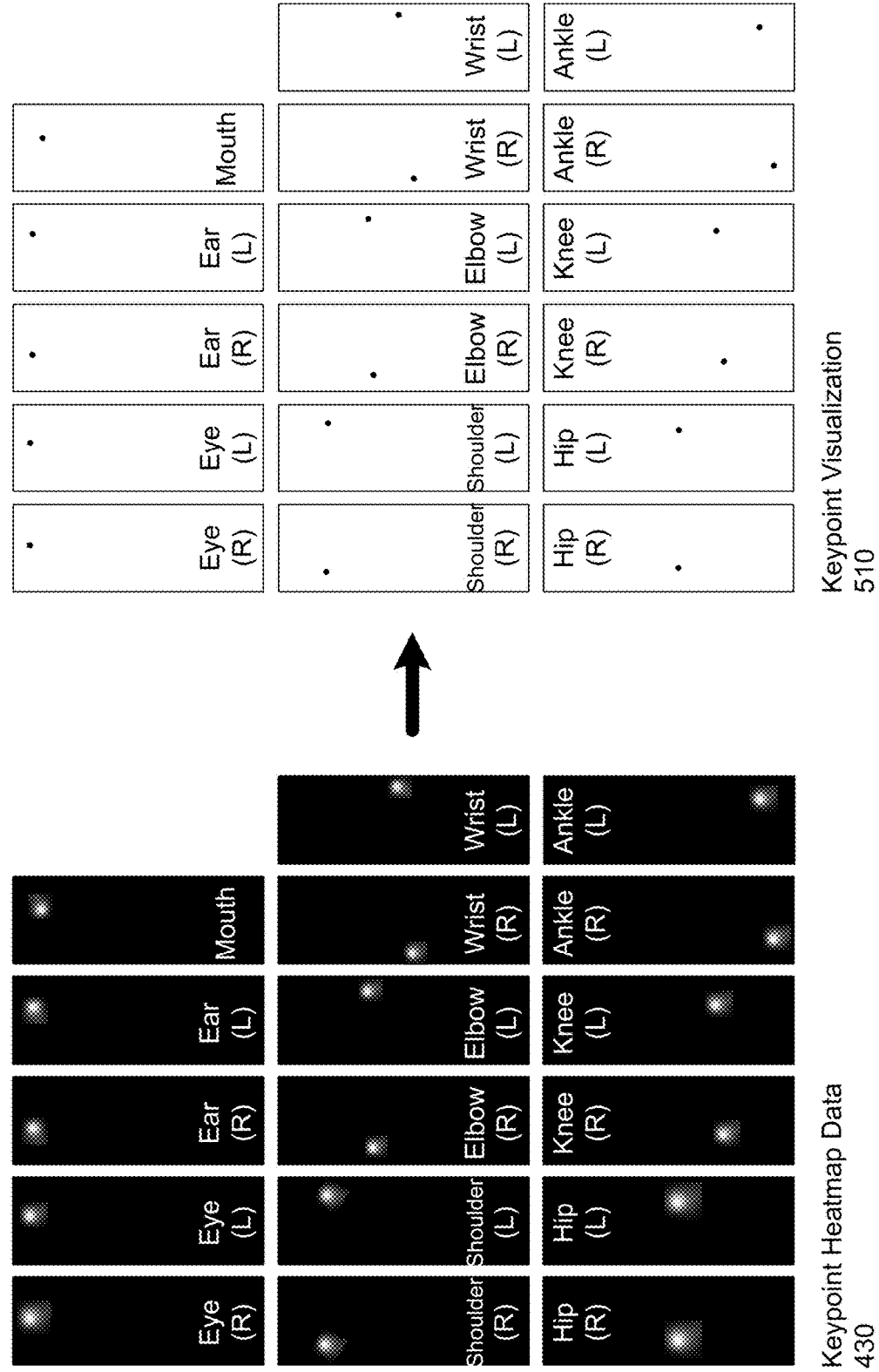
Figure 6B:
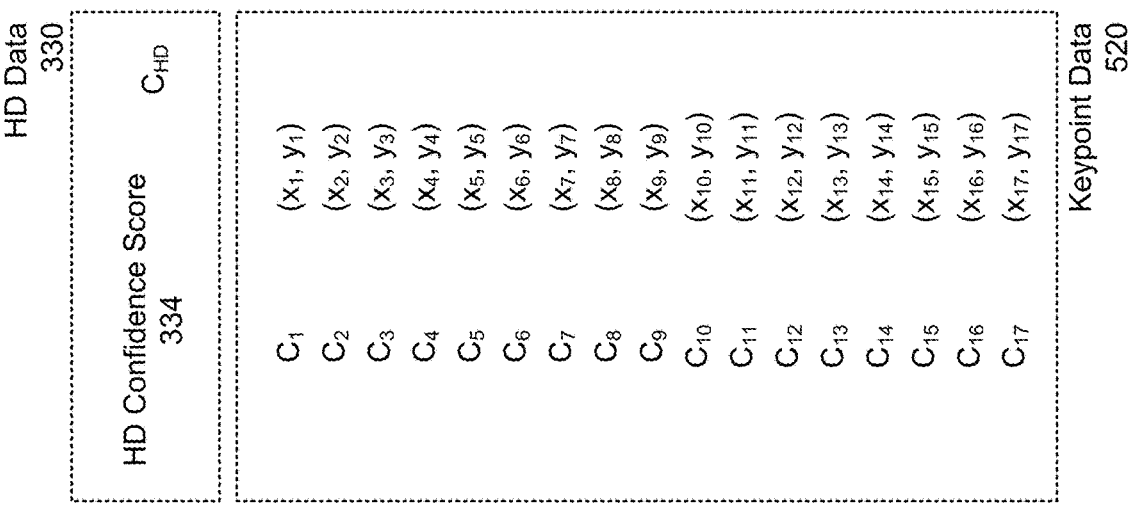
Figure 6C:
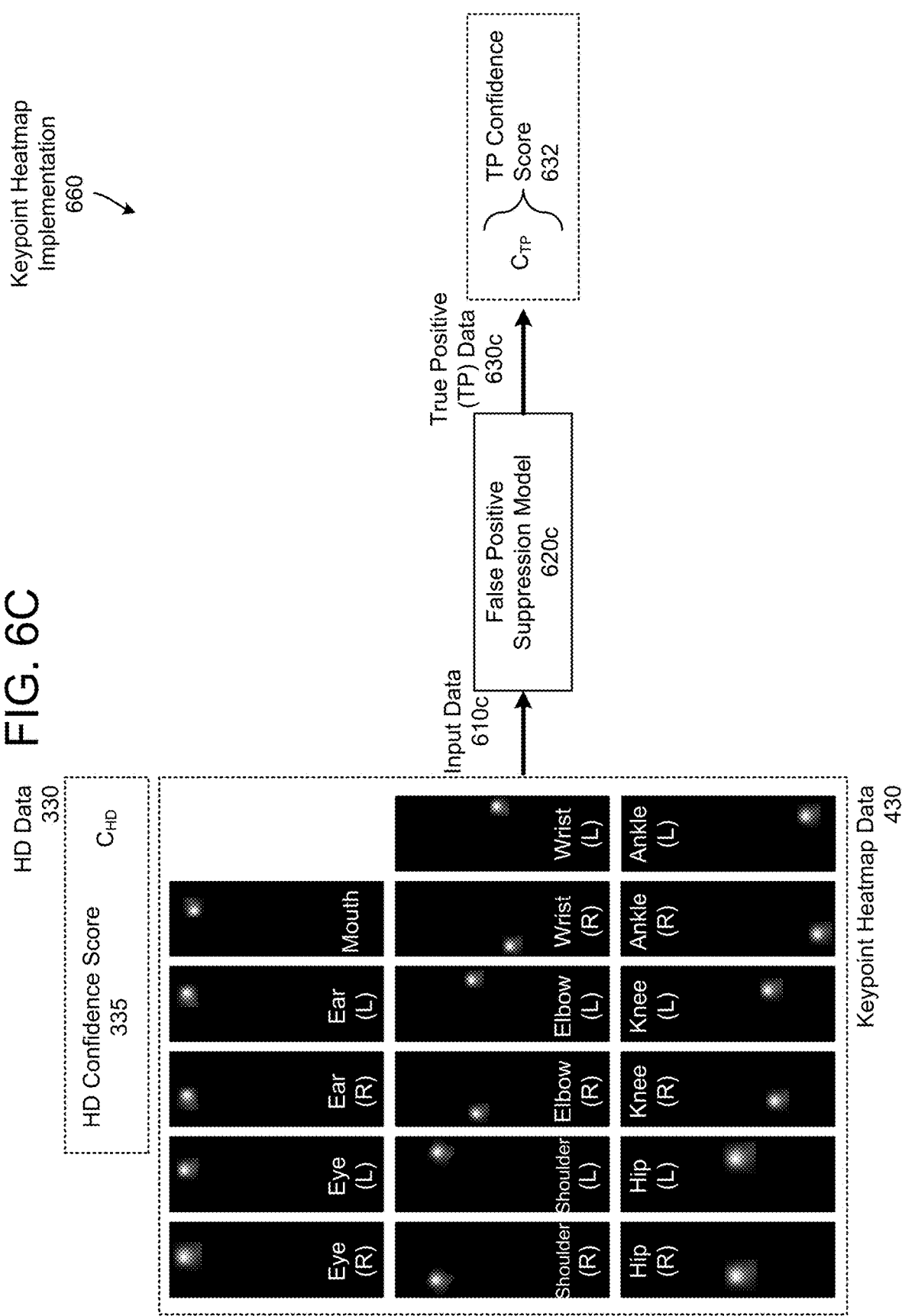

For ease of illustration, the heatmaps illustrated in FIGS. 4, 5A, and 6C are monochromatic (e.g., black and white), such that the pixel value corresponds to an intensity value ranging across a spectrum from a minimum pixel intensity value (e.g., 0, which corresponds to black) to a peak intensity value (e.g., maximum pixel intensity value, which corresponds to white). The minimum pixel intensity value corresponds to a keypoint confidence value of zero (e.g., 0% or 0.0), which indicates that the pixel is not associated with the keypoint and/or the keypoint is not represented by the pixel. The maximum intensity value corresponds to a keypoint confidence value of one (e.g., 100% or 1.0), which indicates that the pixel is associated with the keypoint in question. The remaining pixel intensity values vary based on corresponding keypoint confidence values that range between 0.0 and 1.0. While the heatmaps illustrated in FIGS. 4, 5A, and 6C are monochromatic, the disclosure is not limited thereto. Instead, the pixel value may correspond to a color value or to a color value and an intensity value without departing from the disclosure.

To generate the intensity values, the detector 102 may translate the keypoint confidence values based on a global maximum keypoint confidence value, such that the intensity values are proportional to the keypoint confidence values. For example, the detector 102 may determine that the keypoint confidence values range from the minimum keypoint confidence value (e.g., 0%) to the maximum keypoint confidence value (e.g., 100%) and may translate the keypoint confidence values to intensity values ranging from a minimum intensity value (e.g., 0) to a maximum intensity value (e.g., 100000). Thus, the minimum keypoint confidence value (e.g., 0% or 0.0) corresponds to the minimum intensity value (e.g., 0), a first keypoint confidence value (e.g., 20% or 0.2) corresponds to an intensity value of roughly 20000, a second keypoint confidence value (e.g., 40% or 0.4) corresponds to an intensity value of roughly 40000, a third confidence value (e.g., 60% or 0.6) corresponds to an intensity value of roughly 6000, a fourth keypoint confidence value (e.g., 80% or 0.8) corresponds to an intensity value of roughly 8000, and the maximum confidence value (e.g., 100% or 1.0) corresponds to the maximum intensity value (e.g., 100000).

For ease of illustration, the above example illustrates the maximum intensity value having a value of 100000. However, the disclosure is not limited thereto and the maximum intensity value may vary without departing from the disclosure. For example, the maximum intensity value may depend on a pixel format (e.g., number of bits used to represent a pixel) used for the heatmap data, with an 8-bit pixel format having a maximum intensity value of 255, a 16-bit pixel format having maximum intensity value of 65536, and so on.

For ease of illustration, the keypoint heatmaps illustrate the intensity values using colors ranging from black to white instead of numeric integers. However, each color corresponds to a specific numeric integer. Thus, the keypoint heatmap data may include the numeric integers corresponding to the pixel intensity values and/or keypoint confidence values corresponding to the pixel intensity values, and the detector 102 may convert between these numeric integers (e.g., pixel intensity values) and the keypoint confidence values without departing from the disclosure. For example, the minimum intensity value (e.g., 0) is represented as black, first intensity values (e.g., 20000 and 40000) associated with a relatively low keypoint confidence value (e.g., under 0.5) are represented as varying shades of dark gray, second intensity values (e.g., 60000 and 80000) associated with a relatively high keypoint confidence value (e.g., above 0.5) are represented as varying shades of light gray, and the maximum intensity value (e.g., 100000) associated with the maximum keypoint confidence value (e.g., 1.0) is represented as white.

As described above, the keypoint heatmap data 430 may include seventeen individual keypoint heatmaps corresponding to seventeen unique keypoints. Thus, an individual keypoint heatmap indicates a keypoint confidence value for every pixel in the cropped image data 340. For example, the first keypoint heatmap for the first keypoint (e.g., right eye) illustrates a likelihood that each individual pixel in the cropped image data 340 represents the first keypoint (e.g., a right eye) of the human that is detected in the cropped image data 340. Similarly, the second keypoint heatmap for the second keypoint (e.g., left eye) illustrates a likelihood that each individual pixel in the cropped image data 340 represents the second keypoint (e.g., a left eye) of the human that is detected in the cropped image data 340.

As the person represented in the cropped image data 340 is facing towards the camera (e.g., frontal position) and no limbs or joints are occluded or outside of the cropped image data 340, each of the keypoint heatmaps illustrated in FIG. 4 indicate a tight grouping of keypoint confidence values at an approximate location of the keypoint. Thus, a size of the clusters or high keypoint confidence values represented in the keypoint heatmaps is relatively similar for all seventeen keypoints. However, the disclosure is not limited thereto and the keypoint heatmaps may vary drastically without departing from the disclosure.

To illustrate an example, the keypoint heatmaps may vary based on whether a corresponding keypoint is visible (e.g., small cluster of high keypoint confidence values) or occluded (e.g., large cluster of medium or even low keypoint confidence values) in the cropped image data 340. For example, if the person represented in the cropped image data 340 is not facing the camera (e.g., facing away from the camera or facing to either side) and/or has limbs extending outside of the cropped image data 340, some of the keypoint heatmaps may indicate low keypoint confidence values for a particular keypoint and/or a clustering of the highest keypoint confidence values may cover a larger area than depicted in FIG. 4 without departing from the disclosure.

FIGS. 5A-5B illustrate an example of converting keypoint heatmap data to keypoint data that includes keypoint confidence scores according to examples of the present disclosure. As described above, the keypoint heatmaps represent keypoint confidence values for each of the individual pixels in the cropped image data 340. Using this information, the detector 102 may determine (i) a highest keypoint confidence value represented in the keypoint heatmap, and (ii) a location associated with the keypoint. In some examples, the location may correspond to two-dimensional coordinates (e.g., $(x_1, y_1)$) associated with the highest keypoint confidence value. However, the disclosure is not limited thereto, and the detector 102 may determine two-dimensional coordinates corresponding to a center of the cluster without departing from the disclosure.

As illustrated in FIG. 5A, the detector 102 may process the keypoint heatmap data 430 to determine locations associated with each of the keypoints, represented by keypoint visualization 510. For example, the detector 102 may determine a location for each keypoint that corresponds to a local peak intensity value in the keypoint heatmap. For ease of illustration, FIGS. 5A-5B illustrate the keypoint visualization 510 representing the keypoint locations. However, in some examples the detector 102 does not generate the keypoint visualization and may instead generate keypoint data 520 illustrated in FIG. 5B.

As illustrated in FIG. 5B, the keypoint data 520 may include a keypoint identifier 522, a keypoint confidence value 524, and a keypoint location 526 for individual keypoints. For example, the keypoint data 520 may include a first keypoint identifier 522a (e.g., Eye (R)), a first keypoint confidence value 524a (e.g., $C_1$), and a first keypoint location 526a represented by first coordinates $(x_1, y_1)$ corresponding to the first keypoint (e.g., right eye). Similarly, the keypoint data 520 may include a second keypoint identifier 522b (e.g., Eye (L)), a second keypoint confidence value 524b (e.g., $C_2$), and a second keypoint location 526b represented by second coordinates $(x_2, y_2)$ corresponding to the second keypoint (e.g., left eye).

As the example illustrated in FIG. 5B includes seventeen keypoints (e.g., seventeen unique keypoint identifiers 522), the keypoint data 520 includes seventeen rows of data and/or seventeen sets of keypoint confidence values 524 and keypoint locations 526. However, the disclosure is not limited thereto and the number of keypoints may vary without departing from the disclosure.

While FIG. 5B illustrates the keypoint data 520 including the keypoint identifier 522, the disclosure is not limited thereto. In some examples, the keypoint confidence values 524 and/or keypoint locations 526 associated with the keypoints may be arranged in a known sequential order, such that the keypoint identifier 522 is omitted but the detector 102 associates values within the keypoint data 520 with a corresponding keypoint without departing from the disclosure.

In some examples, the detector 102 may include a first component configured to receive the seventeen keypoint confidence values (e.g., $C_1$-$C_{17}$) generated by the HKD model 420 and generate a true positive (TP) confidence score (e.g., $C_{TP}$). For example, the first component may generate the TP confidence score $CT_{TP}$ by taking a mean (e.g., average) of the seventeen keypoint confidence values $C_1$-$C_{17}$. However, the disclosure is not limited thereto, and in some examples the first component may identify a first number N of highest keypoint confidence values and generate the TP confidence score $C_{TP}$ by taking a mean (e.g., average) of the first number N of highest keypoint confidence values. For example, the first component may generate the TP confidence score $C_{TP}$ by averaging the eight highest keypoint confidence values of the seventeen keypoint confidence values $C_1$-$C_{17}$. The disclosure is not limited thereto, however, and the first component may generate the TP confidence score $C_{TP}$ by averaging any number of the keypoint confidence values without departing from the disclosure.

Additionally or alternatively, the first component may generate the TP confidence score $C_{TP}$ using a predetermined subset of the seventeen keypoint confidence values $C_1$-$C_{17}$ without departing from the disclosure. For example, the first component may generate the TP confidence score $C_{TP}$ by averaging the twelve keypoint confidence values associated with the body (e.g., $C_6$-$C_{17}$) and ignoring the five keypoint confidence values associated with the head (e.g., $C_1$-$C_5$).

While the examples described above refer to taking a mean of the keypoint confidence values, the disclosure is not limited thereto and the first component may use a variety of techniques without departing from the disclosure. For example, the first component may generate the TP confidence score $C_{TP}$ using a weighted sum of the seventeen keypoint confidence values $C_1$-$C_{17}$ or other mathematical operations without departing from the disclosure. As described in greater detail below with regard to FIG. 7, the detector 102 may use the HD confidence score $C_{HD}$ and the TP confidence score $C_{TP}$ to distinguish between a true positive and a false positive and remove a bounding box corresponding to a false positive.

To further reduce false positives, the first component may include a machine learning model configured to generate the TP confidence score $C_{TP}$. For example, the machine learning model may take the seventeen keypoint confidence values $C_1$-$C_{17}$ and/or the HD confidence score $C_{HD}$ as input data points and may perform logistic regression to generate the TP confidence score $C_{TP}$, although the disclosure is not limited thereto.

FIGS. 6A-6C illustrate examples of false positive suppression models according to examples of the present disclosure. Using the HD data 330, the keypoint data 520, and/or the keypoint heatmap data 430, the detector 102 may generate a true positive (TP) confidence score (e.g., $C_{TP}$) that indicates a likelihood that the bounding box 332 represents a human. As described above, this TP confidence score $C_{TP}$ may enable the detector 102 to suppress or reduce a number of false positives that occur when a bounding box has a HD confidence score above a threshold value despite the bounding box not representing a human. As illustrated in FIGS. 6A-6C, the detector 102 may process input data 610 using a false positive suppression model 620 to generate true positive (TP) data 630, which includes a TP confidence score $C_{TP}$ 632.

FIG. 6A illustrates an example of a keypoint confidence implementation 600, in which the false positive suppression model 620 generates the true positive (TP) data 630 based on the HD data 330 and a portion of the keypoint data 520. As illustrated in FIG. 6A, first input data 610a corresponds to eighteen numerical values (e.g., eighteen confidence values). For example, the first input data 610a may include the seventeen keypoint confidence values (e.g., $C_1$-$C_{17}$) generated by the HKD model 420, which are collectively referred to as keypoint confidence data 524, along with the HD confidence score 334 (e.g., $C_{HD}$) generated by the HK model 320. A first false positive suppression model 620a processes the first input data 610a and generates first TP data 630a.

The first false positive suppression model 620a may correspond to a machine learning model. For example, the first false positive suppression model 620a may be trained to use the eighteen confidence values as input data points and perform logistic regression to generate the first TP data 630a, although the disclosure is not limited thereto and the first false positive suppression model 620a may use a variety of techniques without departing from the disclosure. In the example illustrated in FIG. 6A, the first TP data 630a corresponds to a single numerical value represented as a TP confidence score 632 (e.g., $C_{TP}$). As described in greater detail below with regard to FIG. 7, the detector 102 may use the HD confidence score $C_{HD}$ and/or the TP confidence score $C_{TP}$ to distinguish between a true positive and a false positive and remove a bounding box corresponding to a false positive.

FIG. 6B illustrates an example of a keypoint confidence and location implementation 650, in which the false positive suppression model 620 generates the true positive (TP) data 630 based on the HD data 330 and all of the keypoint data 520. As illustrated in FIG. 6B, second input data 610b corresponds to eighteen numerical values (e.g., eighteen confidence values) along with seventeen coordinates. For example, the second input data 610b may include the HD confidence score 334 (e.g., $C_{HD}$) generated by the HK model 320, the keypoint confidence data 524 (e.g., seventeen keypoint confidence values $C_1$-$C_{17}$) generated by the HKD model 420, and keypoint location data 526 (e.g., seventeen coordinates $[x_1, y_1], [x_2, y_2] \ldots [x_{17}, y_{17}]$) generated by the HKD model 420. A second false positive suppression model 620b processes the second input data 610b and generates second TP data 630b.

The second false positive suppression model 620b may correspond to a machine learning model. For example, the second false positive suppression model 620b may be trained to use the eighteen confidence values and seventeen coordinates as input data points and perform logistic regression to generate the second TP data 630b, although the disclosure is not limited thereto and the second false positive suppression model 620b may use a variety of techniques without departing from the disclosure. In the example illustrated in FIG. 6B, the second TP data 630b corresponds to a single numerical value represented as the TP confidence score 632 (e.g., $C_{TP}$). As described in greater detail below with regard to FIG. 7, the detector 102 may use the HD confidence score $C_{HD}$ and/or the TP confidence score $C_{TP}$ to distinguish between a true positive and a false positive and remove a bounding box corresponding to a false positive.

FIG. 6C illustrates an example of a keypoint heatmap implementation 660, in which the false positive suppression model 620 generates the TP data 630 based on the keypoint heatmap data 430. As illustrated in FIG. 6C, instead of processing the keypoint data 520 as described above, third false positive suppression model 620c may process the keypoint heatmap data 430 directly. For example, instead of converting the keypoint heatmap data 430 to the keypoint data 520 by determining the keypoint confidence data 524 (e.g., maximum confidence values for each keypoint) and corresponding keypoint locations 526, the detector 102 may input the keypoint heatmap data 430 directly into the third false positive suppression model 620c to generate third TP data 630c. Thus, FIG. 6C illustrates an example in which third input data 610c corresponds to seventeen keypoint heatmaps generated by the HKD model 420 along with the HD confidence score 334 (e.g., $C_{HD}$) generated by the HK model 320.

The third false positive suppression model 620c may correspond to a machine learning model. In some examples, the third false positive suppression model 620c may be configured to determine the seventeen keypoint confidence values (e.g., $C_1$-$C_{17}$) based on the seventeen keypoint heatmaps represented in the keypoint heatmap data 430, and perform logistic regression using the eighteen confidence values to generate the third TP data 630c. However, the disclosure is not limited thereto, and in other examples the third false positive suppression model 620c may ingest the HD confidence score $C_{HD}$ and the seventeen keypoint heatmaps represented in the keypoint heatmap data 430 and directly generate the third TP data 630c without departing from the disclosure.

In the example illustrated in FIG. 6C, the third TP data 630c corresponds to a single numerical value represented as a TP confidence score 632 (e.g., $C_{TP}$). As described in greater detail below with regard to FIG. 7, the detector 102 may use the HD confidence score $C_{HD}$ and/or the TP confidence score $C_{TP}$ to distinguish between a true positive and a false positive and remove a bounding box corresponding to a false positive.

While FIGS. 6A-6C illustrate examples in which the false positive suppression models 620 generate the TP confidence score $C_{TP}$, the disclosure is not limited thereto. In some examples, the false positive suppression models 620 may instead process the input data 610 and generate a binary output indicating whether the HD confidence score $C_{HD}$ is a false positive or not. For example, the false positive suppression model 620 may determine that there is a high probability that a human is represented in the bounding box 332 (e.g., human presence is detected), resulting in the false positive suppression model outputting a first binary value (e.g., 1) indicating that that the HD confidence score $C_{HD}$ corresponds to a true positive. In response to the first binary value, the detector 102 may keep the bounding box 332 and the HD confidence score $C_{HD}$. Alternatively, the false positive suppression model 620 may determine that there is a low probability that a human is represented in the bounding box 332 (e.g., human presence is not detected), resulting in the false positive suppression model 620 outputting a second binary value (e.g., 0) indicating that that the HD confidence score $C_{HD}$ corresponds to a false positive. In response to the second binary value, the detector 102 may discard the bounding box 332 and the HD confidence score $C_{HD}$. Thus, in this example, the binary output generated by the false positive suppression model 620 may be applied to the corresponding bounding box in order to suppress or reduce the number of false positives.

FIG. 7 illustrates examples of distinguishing between false positives and true positives based on HD confidence values and TP confidence values according to examples of the present disclosure. As illustrated in FIG. 7, a combined confidence chart 710 includes a plurality of data points representing bounding boxes generated by the detector 102. Coordinates for an individual bounding box are determined based on an individual HD confidence score $C_{HDn}$ and an individual TP confidence score $C_{TPn}$ corresponding to the bounding box. For example, the combined confidence chart 710 plots the HD confidence score $C_{HD}$ along a first axis (e.g., horizontal axis), such that an x-coordinate for an individual bounding box is a value between 0.5 and 1.0 corresponding to the individual HD confidence score $C_{HDn}$ for the bounding box. Similarly, the combined confidence chart 710 plots the TP confidence score $C_{TP}$ along a second axis (e.g., vertical axis), such that a y-coordinate for an individual bounding box is a value between 0.0 and 1.0 corresponding to the individual TP confidence score $C_{TPn}$ for the bounding box.

In the example illustrated in FIG. 7, the x-coordinates range between a lower threshold (e.g., 0.5) and the maximum confidence value (e.g., 1.0) because the detector 102 is configured to discard bounding boxes having an HD confidence score $C_{HD}$ below a first presence detection threshold value (e.g., 0.5, which may also be referred to as a detection threshold value). Thus, if the first presence detection threshold value varies, the lower threshold associated with the x-coordinates will vary accordingly. For example, raising the first presence detection threshold value to a first value (e.g., 0.6) will remove current data points below the first value (e.g., between 0.5-0.6), whereas lowering the first presence detection threshold value to a second value (e.g., 0.4) would result in additional data points being added below the current presence detection threshold (e.g., between 0.4-0.5). In contrast, the y-coordinates range between a minimum confidence value (e.g., 0.0) and the maximum confidence value (e.g., 1.0), as the detector 102 has not prefiltered the TP confidence scores CTP by comparing them to a first presence detection threshold value.

The data points represented in the combined confidence chart 710 correspond to bounding boxes associated with test data, for which there is a known outcome. Thus, we have a ground truth for each data point indicating whether the data point is a true positive (e.g., human presence is detected in the bounding box) or a false positive (e.g., the bounding box does not represent a human or a portion of a human). As illustrated in FIG. 7, true positives are represented using black, whereas false positives are represented using a lighter shade of gray. To provide additional clarity, FIG. 7 includes a false positive chart 720 representing a first portion of the data points that correspond to false positives, and a true positive chart 730 representing a second portion of the data points that correspond to true positives.

As illustrated in the combined confidence chart 710, the TP confidence score $C_{TP}$ has a correlation with human presence detection and can be used to distinguish between the true positives and the false positives. For example, as the TP confidence score $C_{TP}$ increases, a probability that the bounding box detects human presence (e.g., is a true positive) increases.

Further, the combination of the HD confidence score $C_{HD}$ and the TP confidence score $C_{TP}$ has a strong correlation with human presence detection and can be used to further distinguish between the true positives and the false positives. For example, as both the HD confidence score $C_{HD}$ and the TP confidence score $C_{TP}$ increase, the probability that the bounding box detects human presence (e.g., is a true positive) increases by a significant amount. To illustrate an example, if either the HD confidence score $C_{HD}$ or the TP confidence score $C_{TP}$ is above a first threshold value (e.g., roughly 0.8), the probability that the bounding box detects human presence is close to 1.0 (e.g., there are no false positives). In contrast, if both the HD confidence score $C_{HD}$ and the TP confidence score $C_{TP}$ are below the first threshold value (e.g., ranging from 0.0 to 0.8), there is still a chance that the bounding box is a false positive.

As illustrated in FIG. 7, using a two-dimensional coordinate system (e.g., using both the HD confidence score $C_{HD}$ and the TP confidence score $C_{TP}$) enables the detector 102 to further distinguish between the true positives and the false positives and reduce the number of false positives. For example, the detector 102 may compare the TP confidence score $C_{TP}$ to a second presence detection threshold value and remove a corresponding bounding box (e.g., suppress a false positive) when the TP confidence score $C_{TP}$ is below the second presence detection threshold value. The disclosure is not limited thereto, however, and the detector 102 may determine to remove the bounding box and/or suppress the false positive using other techniques without departing from the disclosure.

In some examples, the second presence detection threshold value associated with the TP confidence score $C_{TP}$ may be identical to the first presence detection threshold value associated with the HD confidence score $C_{HD}$ without departing from the disclosure. For example, the detector 102 may use a single presence detection threshold value (e.g., 0.5, although the disclosure is not limited thereto) for both the HD confidence score $C_{HD}$ and the TP confidence score $C_{TP}$. However, the disclosure is not limited thereto and in other examples the second presence detection threshold value may be different than the first presence detection threshold value without departing from the disclosure.

FIG. 7 illustrates a simple example to conceptually illustrate how the TP confidence score $C_{TP}$ may be used to distinguish between false positives and true positives. For example, the combined confidence chart 710 provides an illustration of how the HD confidence score $C_{HD}$ and the TP confidence score $C_{TP}$ may both be used to identify a false positive. In the example illustrated in FIG. 7, the TP confidence score $C_{TP}$ may be determined by averaging some or all of the seventeen keypoint confidence values $C_1$-$C_{17}$. Thus, the HD confidence score $C_{HD}$ and the TP confidence score $C_{TP}$ may each provide unique data points in order for a component to make a determination as to whether a bounding box corresponds to a false positive or a true positive.

While FIG. 7 illustrates an example in which the detector 102 generates the TP confidence score $C_{TP}$ and then suppresses false positives by analyzing both the HD confidence score $C_{HD}$ and the TP confidence score $C_{TP}$, the disclosure is not limited thereto. Instead, the detector 102 may suppress false positives using only the TP confidence score $C_{TP}$ without departing from the disclosure. To illustrate an example, the detector 102 may initially compare the HD confidence score $C_{HD}$ to the first presence detection threshold value to determine that human presence may be detected and perform additional analysis. If the detector 102 identifies a bounding box and a HD confidence score $C_{HD}$ associated with the bounding box exceeds the first presence detection threshold value, the detector 102 may perform the additional analysis to determine whether the bounding box is a true positive or a false positive.

As described above with regard to FIGS. 6A-6C, the detector 102 may perform the additional analysis using the false positive suppression model 620. For example, the detector 102 may process the HD confidence score 334 (e.g., $C_{HD}$) generated by the HK model 320, the keypoint confidence data 524 (e.g., seventeen keypoint confidence values $C_1$-$C_{17}$) generated by the HKD model 420, keypoint location data 526 (e.g., seventeen coordinates $[x_1, y_1]$, $[x_2, y_2] \ldots [x_{17}, y_{17}]$) generated by the HKD model 420, and/or a combination thereof (e.g., portions of the keypoint confidence data 524 and/or portions of the keypoint location data 526) using the false positive suppression model 620 to generate the TP confidence score $C_{TP}$. In this example, the false positive suppression model 620 is a machine learning model that generates the TP confidence score $C_{TP}$ in part based on the HD confidence score $C_{HD}$. As a result, the TP confidence score $C_{TP}$ already factors in the HD confidence score $C_{HD}$ and the detector 102 does not use the HD confidence score $C_{HD}$ to determine if the bounding box corresponds to a false positive. Instead, the detector 102 may compare the TP confidence score $C_{TP}$ to the second presence detection threshold value to detect false positives without departing from the disclosure.

Thus, while FIG. 7 illustrates an example of the detector 102 performing false positive suppression using a two-dimensional coordinate system, this is for illustrative purposes only and the detector 102 may use a one-dimensional coordinate system (e.g., TP confidence score $C_{TP}$) without departing from the disclosure.

Figure 8:
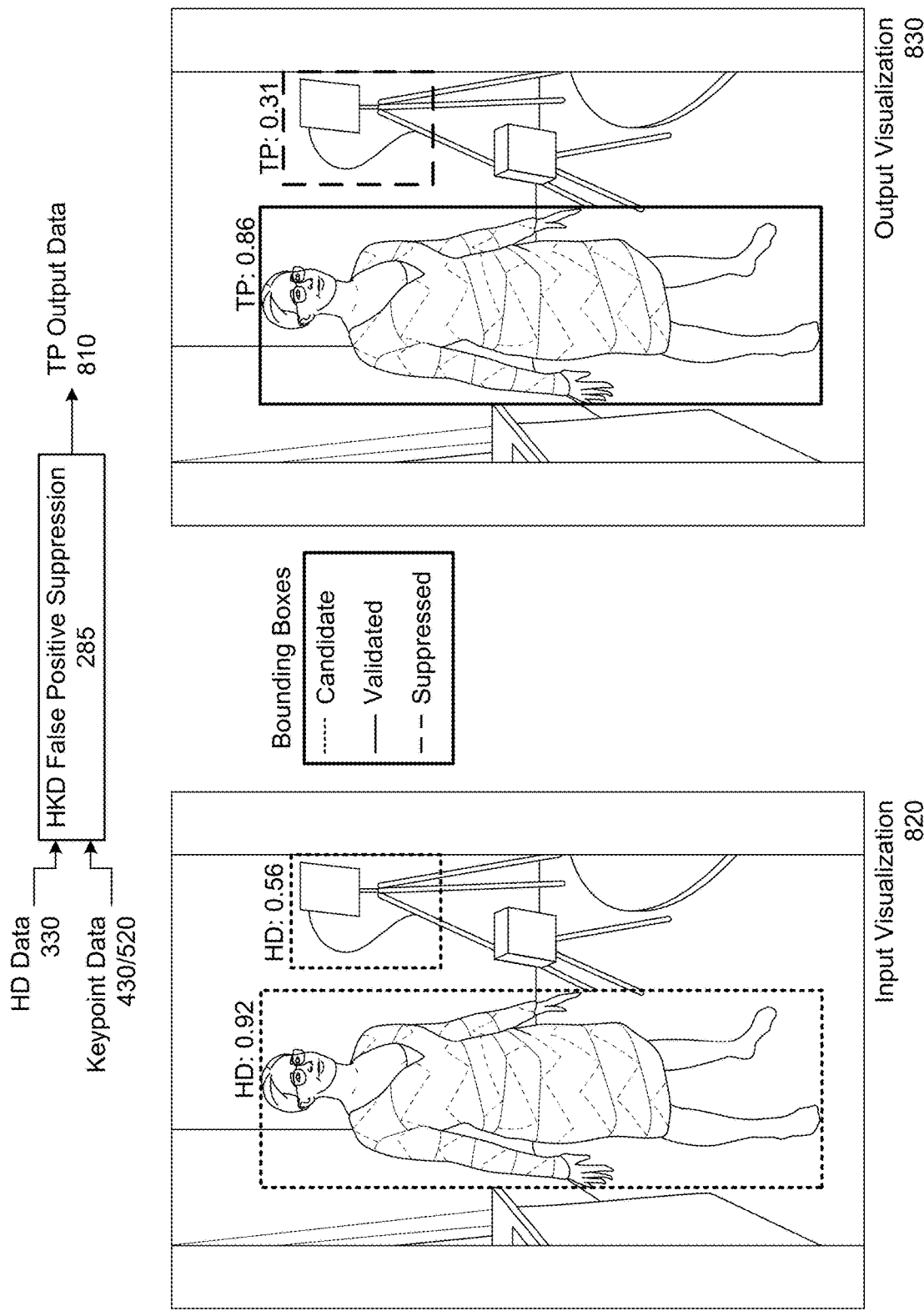
FIG. 8 illustrates an example of performing HKD false positive suppression according to examples of the present disclosure.

FIG. 8 illustrates an example of performing HKD false positive suppression according to examples of the present disclosure. As illustrated in FIG. 8, in some examples the HKD false positive suppression component 285 may remove bounding boxes that are determined to be false positives using the TP confidence score $C_{TP}$. For example, the HKD false positive suppression component 285 may receive the HD data 330 and the keypoint data 430/520 (e.g., the keypoint heatmap data 430 and/or the keypoint data 520) and may generate True Positive (TP) Output Data 810.

As described above with regard to FIG. 3, the HD data 330 may include both the bounding box 332 and the HD confidence score 334 (e.g., $C_{HD}$). FIG. 8 illustrates an example of the HD data 330, which is represented by input visualization 820. As illustrated in FIG. 8, the input visualization 820 illustrates an image of a woman superimposed with the HD data 330. For example, the HD data 330 may include a first bounding box corresponding to the woman (e.g., indicating a first area in which the woman is represented in the image) and a second bounding box corresponding to an object (e.g., indicating a second area in which the object is represented in the image). As illustrated in the input visualization 820, the first bounding box is associated with a first HD confidence score 334a (e.g., HD: 0.92), while the second bounding box is associated with a second HD confidence score 334b (e.g., HD: 0.56). FIG. 8 represents both the first bounding box and the second bounding box using dotted lines to indicate that they are candidate bounding boxes yet to be processed.

As described above with regard to FIGS. 6A-6C, the HKD false positive suppression component 285 may process the HD data 330 (e.g., first confidence score 334a and the second confidence score 334b) and the keypoint data 430/520 to generate TP data 630. For example, the HKD false positive suppression component 285 may include the false positive suppression model 620 and the false positive suppression model 620 may generate a first TP confidence score $C_{TP1}$ corresponding to the first bounding box and a second TP confidence score $C_{TP2}$ corresponding to the second bounding box. As illustrated in the input visualization 830, the first bounding box is associated with the first TP confidence score $C_{TP1}$ (e.g., TP: 0.86), while the second bounding box is associated with the second TP confidence score $C_{TP2}$ (e.g., HD: 0.31).

Based on the first TP confidence score $C_{TP1}$, the HKD false positive suppression component 285 may determine whether the first bounding box is a false positive or a true positive. For example, the HKD false positive suppression component 285 may compare the first TP confidence score $C_{TP1}$ to the second presence detection threshold value (e.g., 0.5). As the first TP confidence score $C_{TP1}$ exceeds the second presence detection threshold value, the HKD false positive suppression component 285 may determine that the first bounding box corresponds to a true positive (e.g., a human is detected in the first bounding box). Thus, the output visualization 830 represents the first bounding box using a solid line to indicate that the first bounding box is validated (e.g., true positive).

Based on the second TP confidence score $C_{TP2}$, the HKD false positive suppression component 285 may determine whether the second bounding box is a false positive or a true positive. For example, the HKD false positive suppression component 285 may compare the second TP confidence score $C_{TP2}$ to the second presence detection threshold value. As the second TP confidence score $C_{TP2}$ is below the second presence detection threshold value, the HKD false positive suppression component 285 may determine that the second bounding box corresponds to a false positive (e.g., a human is not detected in the second bounding box). Thus, the output visualization 830 represents the second bounding box using a dashed line to indicate that the second bounding box is suppressed (e.g., false positive).

If the HKD false positive suppression component 285 determines that a candidate bounding box 332 is a true positive, the HKD false positive suppression component 285 may validate the candidate bounding box 332 and include the bounding box in the TP output data 810. Alternatively, if the HKD false positive suppression component 285 determines that the candidate bounding box 332 is a false positive, the HKD false positive suppression component 285 may suppress (e.g., discard) the candidate bounding box 332 by not including the candidate bounding box 332 in the TP output data 810. In the example illustrated in FIG. 8, the HKD false positive suppression component 285 may validate the first bounding box corresponding to the first TP confidence score $C_{TP1}$ but may suppress the second bounding box corresponding to the second TP confidence score $C_{TP2}$. Thus, the TP output data 810 may only include the first bounding box.

In some examples, the HKD false positive suppression component 285 may simply compare the TP confidence score $C_{TP}$ to the second presence detection threshold and remove the bounding box 332 (e.g., suppress a false positive) when the TP confidence score $C_{TP}$ is below the second presence detection threshold. However, the disclosure is not limited thereto, and in other examples the HKD false positive suppression component 285 may perform additional processing using the HD confidence score $C_{HD}$ and/or the TP confidence score $C_{TP}$ to detect a false positive.

As described above, in some examples the detector 102 may detect a false positive and remove the bounding box 332 without generating the TP confidence score $C_{TP}$. For example, the false positive suppression model 620 may be configured to generate a binary output indicating whether to remove the bounding box 332 without departing from the disclosure. In this example, the HKD false positive suppression component 285 may use the binary outputs generated by the false positive suppression model 620 to determine whether to validate or suppress the bounding boxes while generating the TP output data 810.

Figure 9:
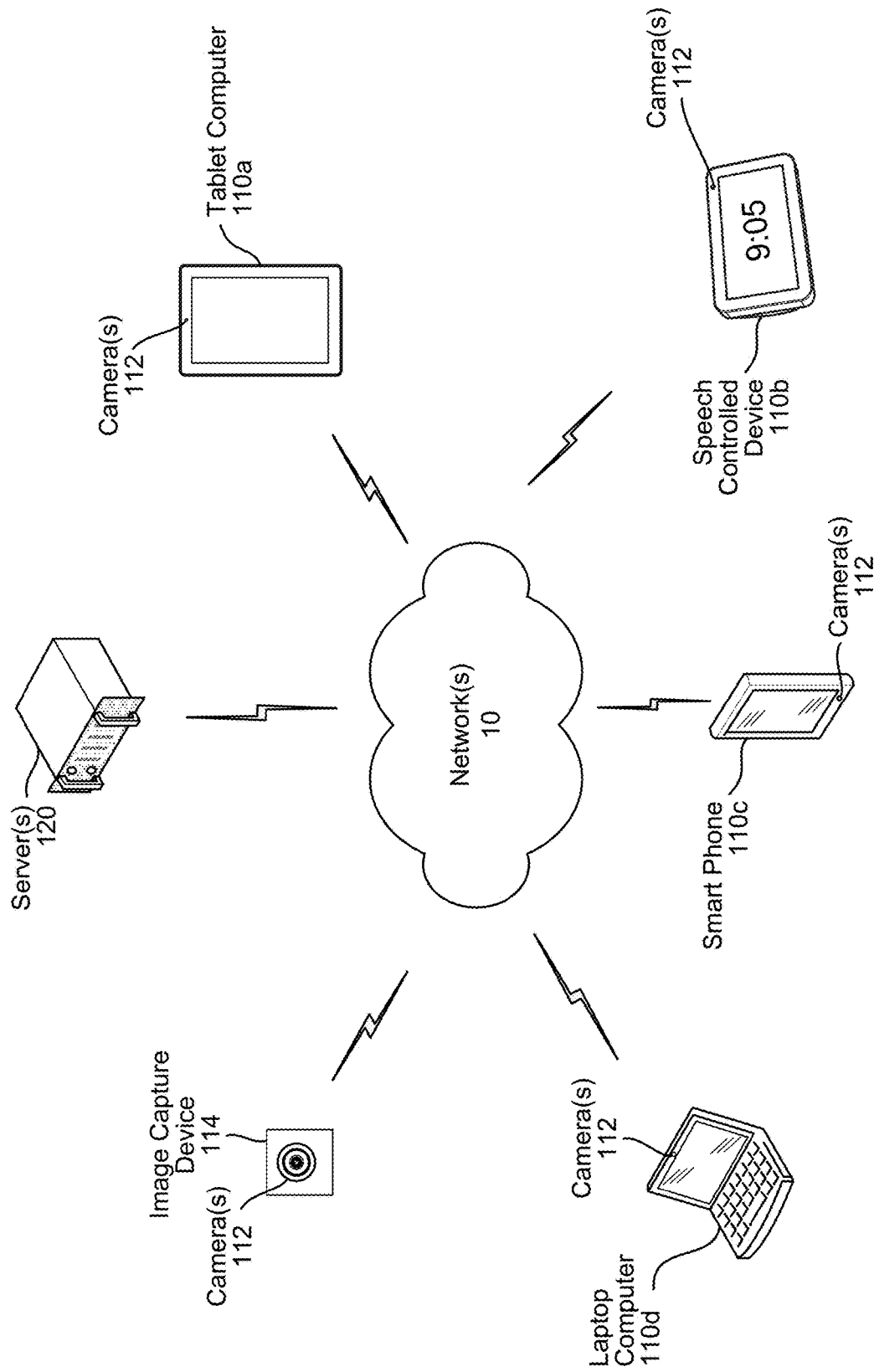
FIG. 9 illustrates an example of a computer network for use with the system.

As illustrated in FIG. 9 devices 110 and/or server(s) 120 may contain components of the system 100 and may be connected over network(s) 10. The network(s) 10 may be a local or private network or may be part of a wider network. Devices 110/server(s) 120 may be connected to the network(s) 10 through either wired or wireless connections. For example, a tablet computer 110a, a speech controlled device 110b, a smart phone 110c, a laptop computer 110d, an image capture device 114, and/or server(s) 120 may be connected to the network(s) 10 through a wired and/or wireless connection.

In some examples, the device 110 may include the detector 102 and may process image data using the detector 102 to perform presence detection and/or detection localization. For example, the device 110 may include camera(s) 112 and may generate image data using the camera(s) 112. Additionally or alternatively, an image capture device 114 or a remote device 110 may include camera(s) 112 and may generate image data using the camera(s) 112. Therefore, the device 110 may receive the image data from the remote device 110/image capture device 114 via the network(s) 10 without departing from the disclosure.

The disclosure is not limited thereto, however, and in other examples the server(s) 120 may include the detector 102 and may process the image data using the detector 102 to perform presence detection and/or detection localization. For example, the device 110 and/or the image capture device 114 may generate the image data using the camera(s) 112 and the server(s) 120 may receive the image data from the device 110/image capture device 114 via the network(s) 10 without departing from the disclosure.

Figure 10:
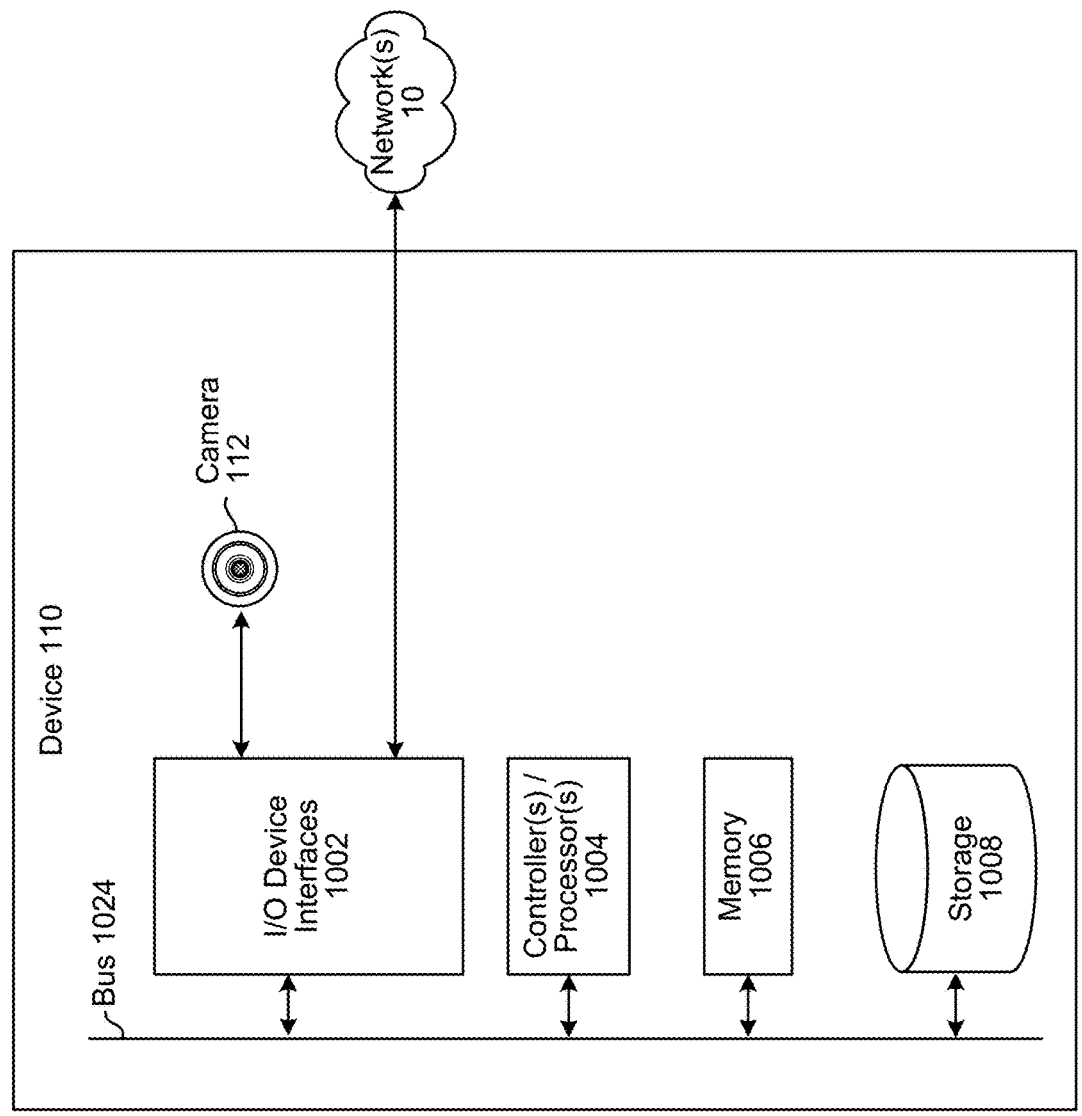
FIG. 10 is a block diagram conceptually illustrating example components of a device according to embodiments of the present disclosure.

FIG. 10 is a block diagram conceptually illustrating a device 110 that may be used with the system. FIG. 11 is a block diagram conceptually illustrating example components of a remote device, such as the remote system including server(s) 120, which may assist with processing input image data and/or generating output data. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the remote system. In operation, each of these devices (or groups of devices) may include computer-readable and computer-executable instructions that reside on the respective device (110/120), as will be discussed further below.

Each of these devices (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as a camera 112, image sensor (not illustrated), or other component capable of generating image data. The device 110 may additionally include a display (not illustrated) for displaying content, although the disclosure is not limited thereto.

The input/output device interfaces 1002 may connect to one or more networks 10 via a wired and/or wireless connection. Examples of wired connections may include Ethernet, a local area network (LAN), and/or the like. Examples of wireless connections may include a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. Through the network(s) 10, the system 100 may be distributed across a networked environment. The I/O device interface (1002/1102) may also include communication components that allow data to be exchanged between devices such as different physical servers in a collection of servers or other components.

In some examples, the device 110 may include the detector 102 and may process image data using the detector 102 to perform presence detection and/or detection localization. For example, the device 110 may be connected to camera(s) 112 through the input/output device interfaces 1010, although the disclosure is not limited thereto. When the camera(s) 112 are connected to the device 110, the camera(s) 112 may generate image data and the device 110 may receive the image data via the input/output device interfaces 1010. Additionally or alternatively, an image capture device 114 or a remote device 110 may include camera(s) 112 and may generate image data using the camera(s) 112. Therefore, the device 110 may receive the image data from the remote device 110/image capture device 114 via the network(s) 10 without departing from the disclosure.

The disclosure is not limited thereto, however, and in other examples the server(s) 120 may include the detector 102 and may process the image data using the detector 102 to perform presence detection and/or detection localization. For example, the device 110 and/or the image capture device 114 may generate the image data using the camera(s) 112 and the server(s) 120 may receive the image data from the device 110/image capture device 114 via the network(s) 10 without departing from the disclosure.

The device 110/server(s) 120 may include a detector 102, as discussed in greater detail above. This component may comprise processor-executable instructions stored in storage (1008/1108) to be executed by controller(s)/processor(s) (1004/1104) (e.g., software, firmware, hardware, or some combination thereof). For example, components of the detector 102 may be part of a software application running in the foreground and/or background on the device 110/server(s) 120. Some or all of the controllers/components of the detector 102 may be executable instructions that may be embedded in hardware or firmware in addition to, or instead of, software. In one embodiment, the device 110/server(s)

120 may operate using an Android operating system (such as Android 4.3 Jelly Bean, Android 4.4 KitKat or the like), an Amazon operating system (such as FireOS or the like), or any other suitable operating system.

The components of the device 110 and the server(s) 120 may include their own dedicated processors, memory, and/or storage. Alternatively, one or more of the components of the device 110 and the server(s) 120 may utilize the I/O interfaces (1002/1102), processor(s) (1004/1104), memory (1006/1106), and/or storage (1008/1108) of the device(s) 110 and the server(s) 120, respectively.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for detecting human presence, comprising:
   receiving first image data;
   determining a first portion of the first image data, the first portion of the first image data including a first plurality of pixels including a first pixel and a second pixel;
   determining a first confidence value for the first portion of the first image data, the first confidence value indicating a first probability that at least a portion of a human is represented in the first portion of the first image data;
   determining that the first confidence value is above a first presence detection threshold value, the first presence detection threshold value indicating that the first portion of the first image data is likely to represent at least a portion of a human;
   generating, using a first model and the first portion of the first image data, at least first pixel intensity data corresponding to the first plurality of pixels and second pixel intensity data corresponding to the first plurality of pixels, the first pixel intensity data including a first pixel intensity value indicating a first likelihood that a first keypoint associated with a human body is represented at the first pixel in the first image data, the second pixel intensity data including a second pixel intensity value indicating a second likelihood that a second keypoint associated with the human body is represented at the second pixel in the first image data;
   determining that the first pixel intensity value is a highest pixel intensity value of the first pixel intensity data;
   determining that the second pixel intensity value is a highest pixel intensity value of the second pixel intensity data;
   determining, using a second model, the first confidence value, the first pixel intensity value, and the second pixel intensity value, a second confidence value, the second confidence value indicating a second probability that at least a portion of a human is represented in the first portion of the first image data;
   determining that the second confidence value is above a second presence detection threshold value, the second presence detection threshold value indicating that the first portion of the first image data is likely to represent at least a portion of a human; and
   in response to determining that the second confidence value is above the second presence detection threshold value, determining that at least a portion of a human is represented in the first portion of the first image data.

2. The computer-implemented method of claim 1, further comprising:
determining a second portion of the first image data, the second portion of the first image data including a second plurality of pixels;
determining a third confidence value for the second portion of the first image data;
determining that the third confidence value is above the first presence detection threshold value;
generating, using the first model and the second portion of the first image data, third pixel intensity data corresponding to the second plurality of pixels and fourth pixel intensity data corresponding to the second plurality of pixels;
determining that a third pixel intensity value is a highest pixel intensity value of the third pixel intensity data;
determining that a fourth pixel intensity value is a highest pixel intensity value of the fourth pixel intensity data;
determining, using the second model, the third confidence value, the third pixel intensity value, and the fourth pixel intensity value, a fourth confidence value;
determining that the fourth confidence value is below the second presence detection threshold value; and
determining that the second portion of the first image data does not represent a portion of a human.

3. A computer-implemented method, the method comprising:
determining a first confidence value, the first confidence value indicating a likelihood that at least a portion of a human is represented in a first portion of first image data;
determining a first plurality of confidence values, the first plurality of confidence values including a second confidence value and a third confidence value, the second confidence value indicating a likelihood that a first keypoint associated with a human body is represented at a first location in the first image data, the third confidence value indicating a likelihood that a second keypoint associated with the human body is represented at a second location in the first image data;
determining, by a first component using the first confidence value, the second confidence value, and the third confidence value, a fourth confidence value indicating a likelihood that at least a portion of a human is represented in the first portion of the first image data;
determining that the fourth confidence value exceeds a threshold value; and
in response to determining that the fourth confidence value exceeds the threshold value, determining that at least a portion of a human is represented in the first portion of the first image data.

4. The computer-implemented method of claim 3, further comprising:
determining a fifth confidence value, the fifth confidence value indicating a likelihood that at least a portion of a human is represented in a second portion of the first image data;
determining a second plurality of confidence values, the second plurality of confidence values including a sixth confidence value and a seventh confidence value, the sixth confidence value indicating a likelihood that the first keypoint is represented at a third location in the first image data, the seventh confidence value indicating a likelihood that the second keypoint is represented at a fourth location in the first image data;
determining, by the first component using the fifth confidence value and the second plurality of confidence values, an eighth confidence value indicating a likelihood that at least a portion of a human is represented in the second portion of the first image data;
determining that the eighth confidence value is below the threshold value; and
determining that the second portion of the first image data does not represent a portion of a human.

5. The computer-implemented method of claim 3, wherein determining the first confidence value further comprises:
receiving the first image data;
determining first coordinate data indicating the first portion of the first image data;
determining the first confidence value for the first portion of the first image data; and
determining that the first confidence value is above a presence detection threshold value.

6. The computer-implemented method of claim 3, wherein determining the first plurality of confidence values further comprises:
receiving the first portion of the first image data;
generating, using a first model and the first portion of the first image data, at least first pixel intensity data and second pixel intensity data, the first pixel intensity data including a first pixel intensity value corresponding to a first pixel and the second pixel intensity data including a second pixel intensity value corresponding to a second pixel;
determining that the first pixel intensity value is a highest pixel intensity value of the first pixel intensity data;
determining, using the first pixel intensity value, the second confidence value;
determining that the second pixel intensity value is a highest pixel intensity value of the second pixel intensity data; and
determining, using the second pixel intensity value, the third confidence value.

7. The computer-implemented method of claim 4, further comprising:
determining first coordinate data associated with the first location in the first image data;
determining second coordinate data associated with the second location in the first image data; and
determining, using at least the first coordinate data and the second coordinate data, posture data indicating at least one of a position or an orientation of the human body in the first image data.

8. The computer-implemented method of claim 3, wherein determining the first plurality of confidence values further comprises:
receiving first pixel intensity data, the first pixel intensity data including a first pixel intensity value;
receiving second pixel intensity data, the second pixel intensity data including a second pixel intensity value;
determining that the first pixel intensity value is a highest pixel intensity value of the first pixel intensity data;
determining, using the first pixel intensity value, the second confidence value;
determining that the second pixel intensity value is a highest pixel intensity value of the second pixel intensity data; and
determining, using the second pixel intensity value, the third confidence value.

9. The computer-implemented method of claim 3, wherein determining the fourth confidence value further comprises:
    determining that the second confidence value and the third confidence value are part of a first number of highest confidence values of the first plurality of confidence values; and
    determining the fourth confidence value using a weighted sum of the first number of highest confidence values.

10. The computer-implemented method of claim 3, wherein determining the fourth confidence value further comprises:
    receiving first pixel intensity data associated with the first keypoint, the first pixel intensity data including a first pixel intensity value representing the second confidence value;
    receiving second pixel intensity data associated with the second keypoint, the second pixel intensity data including a second pixel intensity value representing the third confidence value; and
    processing, by a first model of the first component, the first confidence value, the first pixel intensity data, and the second pixel intensity data to determine the fourth confidence value.

11. The computer-implemented method of claim 3, wherein determining the fourth confidence value further comprises:
    determining first coordinate data associated with the first location in the first image data;
    determining second coordinate data associated with the second location in the first image data; and
    processing, by a first model of the first component, the first confidence value, the first plurality of confidence values, the first coordinate data, and the second coordinate data to determine the fourth confidence value.

12. A device comprising:
    at least one processor; and
    memory including instructions operable to be executed by the at least one processor to cause the device to:
    determine a first confidence value, the first confidence value indicating a likelihood that at least a portion of a human is represented in a first portion of first image data;
    determine a first plurality of confidence values, the first plurality of confidence values including a second confidence value and a third confidence value, the second confidence value indicating a likelihood that a first keypoint associated with a human body is represented at a first location in the first image data, the third confidence value indicating a likelihood that a second keypoint associated with the human body is represented at a second location in the first image data;
    determine, by a first component using the first confidence value, the second confidence value, and the third confidence value, a fourth confidence value indicating a likelihood that at least a portion of a human is represented in the first portion of the first image data;
    determine that the fourth confidence value exceeds a threshold value; and
    in response to the fourth confidence value exceeding the threshold value, determine that at least a portion of a human is represented in the first portion of the first image data.

13. The device of claim 12, wherein the memory further comprises instructions that, when executed by the at least one processor, further cause the device to:
    determine a fifth confidence value, the fifth confidence value indicating a likelihood that at least a portion of a human is represented in a second portion of the first image data;
    determine a second plurality of confidence values, the second plurality of confidence values including a sixth confidence value and a seventh confidence value, the sixth confidence value indicating a likelihood that the first keypoint is represented at a third location in the first image data, the seventh confidence value indicating a likelihood that the second keypoint is represented at a fourth location in the first image data;
    determine, by the first component using the fifth confidence value and the second plurality of confidence values, an eighth confidence value indicating a likelihood that at least a portion of a human is represented in the second portion of the first image data;
    determine that the eighth confidence value is below the threshold value; and
    determine that the second portion of the first image data does not represent a portion of a human.

14. The device of claim 12, wherein the memory further comprises instructions that, when executed by the at least one processor, further cause the device to:
    receive the first image data;
    determine first coordinate data indicating the first portion of the first image data;
    determine the first confidence value for the first portion of the first image data; and
    determine that the first confidence value is above a presence detection threshold value.

15. The device of claim 12, wherein the memory further comprises instructions that, when executed by the at least one processor, further cause the device to:
    receive the first portion of the first image data;
    generate, using a first model and the first portion of the first image data, at least first pixel intensity data and second pixel intensity data, the first pixel intensity data including a first pixel intensity value corresponding to a first pixel and the second pixel intensity data including a second pixel intensity value corresponding to a second pixel;
    determine that the first pixel intensity value is a highest pixel intensity value of the first pixel intensity data;
    determine, using the first pixel intensity value, the second confidence value;
    determine that the second pixel intensity value is a highest pixel intensity value of the second pixel intensity data; and
    determine, using the second pixel intensity value, the third confidence value.

16. The device of claim 12, wherein the memory further comprises instructions that, when executed by the at least one processor, further cause the device to:
    determine first coordinate data associated with the first location in the first image data;
    determine second coordinate data associated with the second location in the first image data; and
    determine, using at least the first coordinate data and the second coordinate data, posture data indicating at least one of a position or an orientation of the human body in the first image data.

17. The device of claim 12, wherein the memory further comprises instructions that, when executed by the at least one processor, further cause the device to:
- receive first pixel intensity data, the first pixel intensity data including a first pixel intensity value;
- receive second pixel intensity data, the second pixel intensity data including a second pixel intensity value;
- determine that the first pixel intensity value is a highest pixel intensity value of the first pixel intensity data;
- determine, using the first pixel intensity value, the second confidence value;
- determine that the second pixel intensity value is a highest pixel intensity value of the second pixel intensity data; and
- determine, using the second pixel intensity value, the third confidence value.

18. The device of claim 12, wherein the memory further comprises instructions that, when executed by the at least one processor, further cause the device to:
- determine that the second confidence value and the third confidence value are part of a first number of highest confidence values of the first plurality of confidence values; and
- determine the fourth confidence value using a weighted sum of the first number of highest confidence values.

19. The device of claim 13, wherein the memory further comprises instructions that, when executed by the at least one processor, further cause the device to:
- receive first pixel intensity data associated with the first keypoint, the first pixel intensity data including a first pixel intensity value representing the second confidence value;
- receive second pixel intensity data associated with the second keypoint, the second pixel intensity data including a second pixel intensity value representing the third confidence value; and
- process, by a first model of the first component, the first confidence value, the first pixel intensity data, and the second pixel intensity data to determine the fourth confidence value.

20. The device of claim 12, wherein the memory further comprises instructions that, when executed by the at least one processor, further cause the device to:
- determine first coordinate data associated with the first location in the first image data;
- determine second coordinate data associated with the second location in the first image data; and
- process, by a first model of the first component, the first confidence value, the first plurality of confidence values, the first coordinate data, and the second coordinate data to determine the fourth confidence value.

* * * * *